US011517876B1

(12) United States Patent
Nazal et al.

(10) Patent No.: US 11,517,876 B1
(45) Date of Patent: Dec. 6, 2022

(54) METHOD OF MAKING ACTIVATED CARBON SORBENT FROM SEAGRASS FOR ORGANIC POLLUTANT REMOVAL FROM WATER

(71) Applicant: KING FAHD UNIVERSITY OF PETROLEUM AND MINERALS, Dhahran (SA)

(72) Inventors: Mazen Khaled Nazal, Dhahran (SA); Nabeel Saeed Abuzaid, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/742,089

(22) Filed: May 11, 2022

Related U.S. Application Data

(60) Provisional application No. 63/292,077, filed on Dec. 21, 2021.

(51) Int. Cl.
| | |
|---|---|
| *C01B 32/05* | (2017.01) |
| *B01J 20/20* | (2006.01) |
| *C01B 32/318* | (2017.01) |
| *B01J 20/28* | (2006.01) |
| *B01J 20/30* | (2006.01) |
| *B01J 20/34* | (2006.01) |
| *C02F 1/28* | (2006.01) |
| *C01B 32/348* | (2017.01) |
| *C02F 101/34* | (2006.01) |

(52) U.S. Cl.
CPC ......... *B01J 20/20* (2013.01); *B01J 20/28066* (2013.01); *B01J 20/28071* (2013.01); *B01J 20/28073* (2013.01); *B01J 20/3078* (2013.01); *B01J 20/3416* (2013.01); *B01J 20/3441* (2013.01); *B01J 20/3475* (2013.01); *C01B 32/318* (2017.08); *C01B 32/348* (2017.08); *C02F 1/283* (2013.01); *C01P 2002/82* (2013.01); *C01P 2002/85* (2013.01); *C01P 2002/88* (2013.01); *C01P 2004/03* (2013.01); *C01P 2006/12* (2013.01); *C01P 2006/14* (2013.01); *C02F 2101/345* (2013.01); *C02F 2303/16* (2013.01)

(58) Field of Classification Search
CPC .................................................. C01B 32/348
See application file for complete search history.

(56) References Cited

U.S. PATENT DOCUMENTS

| | | |
|---|---|---|
| 7,378,372 B2 | 5/2008 | Sylvester |
| 10,519,354 B2 | 12/2019 | Unbehaun et al. |

FOREIGN PATENT DOCUMENTS

| | | |
|---|---|---|
| DE | 11 2013 006 520 T5 | 10/2015 |
| EP | 2 982 649 B1 | 3/2018 |

OTHER PUBLICATIONS

Raymundo-Pinero, 'Turning Carbon Materials for Supercapacitors by Direct Pyrolysis of Seaweeds' in Advanced Functional Materials vol. 19 pp. 1032-1039 (2009). (Year: 2009).*
Pennesi, et al. ; Nonliving biomass of marine macrophytes as artsenic(V) biosorbents ; Journal of Applied Phycology, vol. 24, Issue 6 ; 2012 ; Abstract Only ; 2 Pages.
Krika, et al. ; Impact of NaOH-surface treatment on emerging pollutant biosorption performance using marine algua, Posidonia Oceanica ; Global NEST Journal , vol. 23, No. 1 ; pp. 127-136 ; 10 Pages.
Donati, et al. ; Waste Biomass from Marine Environment as Arsenic and Lead Biosorbent ; Advanced Materials Research, vol. 71-73 ; pp. 597-600 ; May 2009 ; Abstract Only ; 3 Pages.
Aragaw, et al. ; Biomass-Based Adsorbents for Removal of Dyes From Wastewater: A Review ; Frontiers in Environmental Science, vol. 9 ; Dec. 2021 ; 24 Pages.

* cited by examiner

*Primary Examiner* — Stuart L Hendrickson
(74) *Attorney, Agent, or Firm* — Oblon, McClelland, Maier & Neustadt, L.L.P.

(57) ABSTRACT

A method of forming an activated carbon sorbent from a seagrass. The method involves treating a seagrass with a base solution to form an intermediate solid, drying the intermediate solid to form a precursor, and pyrolyzing the precursor at 600 to 1000° C. to form the activated carbon sorbent. Preferably the seagrass is *Halodule uninervis*. The activated carbon sorbent is used in a method of removing an organic pollutant from a contaminated water. Preferred organic pollutants removed are phenols, specifically 2,4-dimethylphenol and 2,4-dichlorophenol.

13 Claims, 13 Drawing Sheets

METHOD OF MAKING ACTIVATED CARBON SORBENT FROM SEAGRASS FOR ORGANIC POLLUTANT REMOVAL FROM WATER

CROSS-REFERENCE TO RELATED APPLICATION

The present application claims priority to U.S. Provisional Application No. 63/292,077, filed Dec. 21, 2021, the teaching of which is hereby incorporated by reference in its entirety for all purposes.

STATEMENT OF PRIOR DISCLOSURE BY THE INVENTORS

Aspects of the present disclosure are described in the article "Effective removal of methylated phenol and chlorinated phenol from aqueous solutions using a new activated carbon derived from *Halodule uninervis* waste" published in Colloid and Surface Interface Communications 2021, Vol 41, 100307, available on Jan. 29, 2021, which is incorporated herein by reference in its entirety.

BACKGROUND OF THE INVENTION

Field of the Invention

The present disclosure relates to a method of forming an activated carbon sorbent using a seagrass, an activated carbon sorbent, and a method of removing an organic pollutant from a contaminated water using the activated carbon sorbent.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Phenolic compounds can be formed naturally as well as by anthropogenic activities. The major anthropogenic sources of phenolic compounds, including methylated and chlorinated phenols in the aquatic environment are from industrial discharges, industrial effluents and the wide usage of pesticides, insecticides, herbicides, fungicides, along with effluents from pharmaceutical products manufacturing. These contaminants have the ability of bioaccumulation and bioconcentration in the food chain. They are toxic, potentially carcinogenic, persistent contaminants, affect the taste and odor of drinking water at very low level of concentrations and can cause disturbances in the reproductive system such as formation of prostate and breast tumors and endometriosis. As a consequence, the World Health Organization (WHO) identified guideline values for some of these compounds and the International Agency for Research on Cancer (IARC) classified them under the group 2B as possibly carcinogenic compounds to humans. Besides, the Environmental Protection Agency (USEPA) listed some of the phenolic compounds, including 2,4-dimethylphenol (DMP) and 2,4-dichlorophenol (DCP), as priority pollutants. Therefore, removing them from the wastewater before discharge into the environment is of utmost importance. There are several techniques employed for removing phenolic compounds from water and wastewater, such as biological treatment, solvent extraction, chemical and electrochemical oxidation, ion exchange, adsorption and membrane separation.

Activated carbon is a commonly used adsorbent for water treatment and other applications such as medicine, catalysis, gas separation, due to its high surface area, porosity and adsorptive capacity. Biomass materials have attracted significant attention, as a carbon-rich, low-cost, renewable and freely available source for the production of activated carbon. Different types of biomass have been investigated for preparation of activated carbon adsorbents for the removal of phenolic compounds, e.g. olive husks [Imad Hamadneh, Rund A. Abu-Zurayk, Ammar H. Al-Dujaili, Water Sci. Technol., 2020, 81, 11, 2351-2367], pine sawdust [Xiaolei Li, Feiqiang Guo, Xiaochen Jiang, Xingmin Zhao, Kuangye Peng, Chenglong Guo, Asian Pacific Chem. Eng., 2018, 13, 5, e2240], rattan sawdust [B. H. Hameed, A. A. Rahman, J. Hazard. Mater., 2008, 160, 2-3, 576-581], coconut husks [P. Gonz'alez-Garcia, Renew. Sust. Energ. Rev., 2018, 82, 1393-1414] and Argan nutshell [M. Zbair, K. Ainassaari, A. Drif, S. Ojala, M. Bottlinger, M. Pirila, R. Brahmi, Environ. Sci. Pollut. Res., 2018, 25, 2, 1869-1882]. However, the biomass source and the methods used in the production of the activated carbon can have dramatic effects on the properties and chemical composition of the resulting activated carbon.

Accordingly, it is an objective of the present disclosure to provide a method of forming an activated carbon sorbent from seagrass biomass and a corresponding activated carbon material having superior adsorbent properties.

SUMMARY OF THE INVENTION

The present disclosure relates to a method of forming an activated carbon sorbent, the method comprising treating a seagrass with a base solution to form an intermediate solid, drying the intermediate solid to form a precursor, and pyrolyzing the precursor at 600 to 1000° C. to form the activated carbon sorbent, wherein the activated carbon sorbent has a mean surface area of 1000 to 1250 m$^2$/g.

In some embodiments, the seagrass is a member of the family Cymodoceaceae.

In some embodiments, the seagrass is a member of the genus *Halodule*.

In some embodiments, the seagrass is *Halodule uninervis*.

In some embodiments, the pyrolyzing is performed under an inert atmosphere for 1 to 12 hours.

In some embodiments, the base solution is an aqueous solution of a hydroxide base.

In some embodiments, the base solution is used in an amount of 5 to 20 mmol hydroxide base per gram of seagrass.

In some embodiments, the activated carbon sorbent has a mean pore volume of 0.400 to 0.525 cc g$^{-1}$.

In some embodiments, the activated carbon sorbent has a point of zero charge pH (pHzpc) of 8 to 11.5.

In some embodiments, the activated carbon sorbent comprises 70 to 92.5 wt % carbon, 7 to 23 wt % oxygen, 1 to 5 wt % calcium, 1 to 5 wt % magnesium, and 0.1 to 0.9 wt % potassium, each based on a total weight of activated carbon sorbent.

The present disclosure also relates to an activated carbon sorbent, comprising 70 to 92.5 wt % carbon, 7 to 23 wt % oxygen, 1 to 5 wt % calcium, 1 to 5 wt % magnesium, and 0.1 to 0.9 wt % potassium, each based on a total weight of activated carbon sorbent, wherein the activated carbon sorbent has a mean surface area of 1000 to 1250 m²/g.

In some embodiments, the activated carbon sorbent has a mean pore volume of 0.400 to 0.525 cc g⁻¹.

In some embodiments, the activated carbon sorbent has a point of zero charge pH (pHzpc) of 8 to 11.5.

The present disclosure also relates to a method of removing an organic pollutant from a contaminated water, the method comprising exposing the contaminated water to an activated carbon sorbent having a mean surface area of 1000 to 1250 m²/g, a mean pore volume of 0.400 to 0.525 cc g⁻¹, and a point of zero charge pH (pHzpc) of 8 to 11.5 to form a saturated sorbent and purified water, and separating the saturated sorbent from the purified water.

In some embodiments, the activated carbon sorbent is used in an amount of 5 to 15 mg per mg of organic pollutant.

In some embodiments, the organic pollutant is a phenol or substituted phenol.

In some embodiments, the phenol or substituted phenol is at least one selected from the group consisting of 2,4-dimethylphenol and 2,4-dichlorophenol.

In some embodiments, the method removes 80 to 99.9% of an initial amount of organic pollutant present in the contaminated water.

In some embodiments, the method further comprises sonicating the saturated sorbent in an aqueous alcohol solution to form a regenerated sorbent, wherein the regenerated sorbent retains greater than 75% of an initial adsorption capacity of the activated carbon sorbent after 2 to 4 regeneration cycles.

BRIEF DESCRIPTION OF THE DRAWINGS

FIG. 8A is for DMP (10-200 mg L⁻¹) and FIG. 8B is for DCP (10-500 mg L⁻¹).

DETAILED DESCRIPTION OF THE INVENTION

Figure 1:
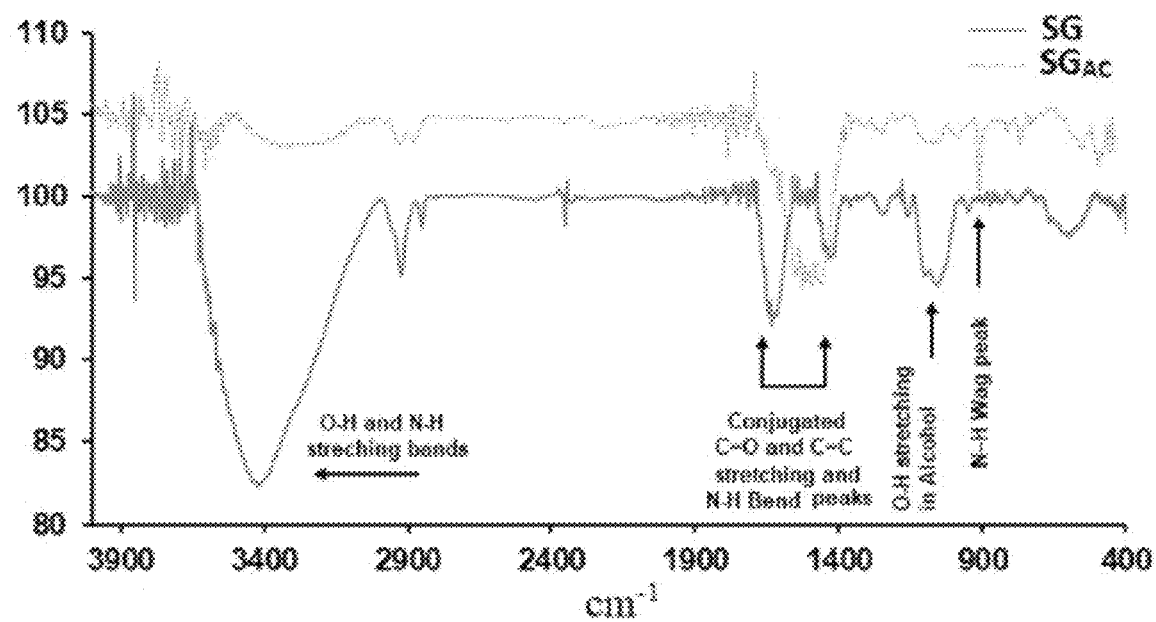
FIG. 1 shows the FTIR spectrum of dried seagrass and the activated carbon sorbent.

In the following description, it is understood that other embodiments may be utilized and structural and operational changes may be made without departure from the scope of the present embodiments disclosed herein.

Definitions

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

According to a first aspect, the present disclosure relates to a method of forming an activated carbon sorbent, the method comprising treating a seagrass with a base solution to form an intermediate solid, drying the intermediate solid to form a precursor, and pyrolyzing the precursor at 600 to 1000° C. to form the activated carbon sorbent.

In general, the seagrass may be any suitable seagrass known to one of ordinary skill in the art. The term "seagrass" refers to flowering plants which grow in marine environments in the order Alismatales. There are four families of seagrasses currently recognized: Posidoniaceae, Zosteraceae, Hydrocharitaceae and Cymodoceaceae. A seagrass from any of these families may be used. In preferred embodiments, the seagrass is a member of the family Cymodoceaceae. This family includes 17 species of seagrass, grouped into five genera. These genera are *Syringodium, Cymodocea, Amphibolis, Thalassodendron*, and *Halodule*. A seagrass from any of these genera may be used. In preferred embodiments, the seagrass is a member of the genus *Halodule*. The genus *Halodule* is common in tropical and semi-tropical oceans and can be found in shores of all continents except Europe and *Antarctica*. The genus is comprised of six species: *Halodule bermudensis*, (found primarily in Bermuda), *Halodule ciliate* (found primarily in Panama), *Halodule emarginata* (found primarily in Brazil), *Halodule pinifolia* (found primarily in the Indian and Pacific Oceans off the costs of, for example, India, Sri Lanka, Southeast Asia, Hainan, Taiwan, Ryukyu Islands, New Guinea, Queensland, Fiji, New Caledonia, Tonga, and the Caroline Islands), *Halodule uninervis* (also found primarily in the Indian and Pacific Oceans, as well as the Red Sea, Persian Gulf, Bay of Bengal), and *Halodule wrightii* (found primarily in the Atlantic Ocean, especially the Caribbean and Gulf of Mexico). While any of these species may be used, in preferred embodiments, the seagrass is *Halodule uninervis*.

In some embodiments, the seagrass may be used in the method substantially as collected (e.g. from a natural source or cultivated source). In some embodiments, the seagrass may be washed prior to use in the method. Preferably, such washing is performed with water. The washing may also be performed with an aqueous surfactant solution. The surfactant may be any suitable surfactant known to one of ordinary skill in the art. In some embodiments, the seagrass may be dried prior to use in the method. Such drying may be performed at any suitable temperature. For example, the drying may be freeze drying, which takes place at or below the freezing point of water (i.e. 0° C.). In another example, the drying may take place at ambient temperature (e.g. from about 20 to about 25° C.). In another example, the drying may take place at elevated temperature (e.g. from about 50 C to about 100° C.). Preferably, the drying reduces a moisture content of the seagrass to below 10%, preferably below 9.5%, preferably below 9%, preferably below 8.5%, preferably below 8%, preferably below 7.5%, preferably below 7%, preferably below 6.5%.

In some embodiments, the seagrass may be reduced to small particles prior to use in the method. In general, the reducing to small particles may be performed by any suitable technique or with any suitable equipment known to one of ordinary skill in the art. Examples of such techniques include, but are not limited to, grinding, ball milling, chopping, pulverizing, crushing, pounding, mincing, shredding, smashing, and fragmenting. In some embodiments, the reducing to small particles may take place using a mill, ball mill, rod mill, autogenous mill, cutting mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles.

In some embodiments, the seagrass is not reduced to small particles prior to use in the method.

In some embodiments, after drying, the seagrass has a mean pore volume of 0.01 to 0.10 cc $g^{-1}$, preferably 0.02 to 0.85 cc $g^{-1}$, 0.025 to 0.075 cc $g^{-1}$, preferably 0.03 to 0.06 cc $g^{-1}$, preferably 0.035 to 0.055 cc $g^{-1}$, preferably 0.045 to 0.050 cc $g^{-1}$, preferably 0.047 cc $g^{-1}$. In some embodiments, after drying, the seagrass has a mean surface area of 5 to 75 $m^2/g$, preferably 10 to 50 $m^2/g$, preferably 15 to 45 $m^2/g$, preferably 20 to 40 $m^2/g$, preferably 25 to 35 $m^2/g$, preferably 29 to 32 $m^2/g$. In some embodiments, after drying, the seagrass comprises 35 to less than 70 wt % carbon, preferably 40 to 65 wt % carbon, preferably 45 to 60 wt % carbon, preferably 47.5 to 55 wt % carbon, preferably 49 to 52.5 wt %, carbon, preferably 50 to 52 wt % carbon, based on a total weight of seagrass. In some embodiments, after drying, the seagrass has a has a point of zero charge pH ($pH_{zpc}$) of 4 to less than 8, preferably 4.5 to 7.75, preferably 5 to 7.5, preferably 5.5 to 7.25, preferably 6 to 7, preferably 6.25 to 6.75, preferably 6.45.

The seagrass is treated with a base solution to form an intermediate solid. The base solution may comprise any suitable base and a solvent. Solvents that may be used include an aprotic organic solvent, a protic organic solvent, water, or mixtures thereof. Examples of aprotic organic solvents include but are not limited to diethyl ether, tetrahydrofuran, acetonitrile, acetone, N,N-dimethylformamide, dimethylsulfoxide, pentane, hexanes, cyclohexane, benzene, toluene, chloroform, dichloromethane, and ethyl acetate. Examples of protic organic solvents include but are not limited to ammonia, t-butanol, n-butanol, n-propanol, 2-propanol, ethanol, and methanol. In some embodiments, the aprotic organic solvent or protic organic solvent is substantially free of water, oxygen, or both. In preferred embodiments, the solvent is water. In some embodiments, the water is substantially free of dissolved salts or other electrolytes. The base may be an organic base or an inorganic base. An organic base refers to an organic compound which acts as a base. Typically, organic bases contain nitrogen atoms which are capable of being protonated, for example amines or nitrogen-containing heterocycles. Examples of organic bases include, but are not limited to pyridines; alkanamines such as methylamine, ethylamine, trimethylamine, and the like; imidazoles; benzimidazoles; histidines; guanidines; phosphazine bases, and hydroxide salts of organoammonium cations. Inorganic bases are inorganic compounds or salts which act as bases. Examples of inorganic bases include carbonate salts or compounds, bicarbonate salts or compounds, hydroxide salts or compounds, and phosphate salts or compounds. In some embodiments, the base is a hydroxide base. In some embodiments, the hydroxide base is an alkali metal hydroxide. In preferred embodiments, the base solution is an aqueous solution of a hydroxide base. In some embodiments, the base solution is used in an amount of 5 to 20 mmol, preferably 7.5 to 17.5 mmol, preferably 10 to 15 mmol, preferably 12.5 mmol hydroxide base per gram of seagrass.

In some embodiments, the treating is performed at 5 to 95° C., preferably 10 to 75° C., preferably 15 to 50° C., preferably 20 to 30° C. In some embodiments, the treating is performed for 1 to 48 hours, preferably 2 to 47 hours, preferably 4 to 46 hours, preferably 6 to 42 hours, preferably 8 to 40 hours, preferably 10 to 38 hours, preferably 12 to 36 hours, preferably 14 to 34 hours, preferably 16 to 32 hours, preferably 18 to 30 hours, preferably 20 to 28 hours, preferably 21 to 27 hours, preferably 22 to 26 hours, preferably 23 to 25 hours, preferably 24 hours. The treating may be performed with a single aliquot of base solution, that is the base solution is not flowed, changed, or otherwise refreshed during the treating. In some embodiments, the base solution is flowed over or through the seagrass. In some embodiments, the treating is performed by soaking, that is the seagrass is immersed in the base solution which is not flowed, changed, or otherwise refreshed during the treating. The soaking may be performed with or without agitation or stirring.

The treatment of the seagrass with the base solution produces an intermediate solid. The intermediate solid is then isolated from the base solution. Such isolation may be performed by any suitable technique known to one of ordinary skill in the art for separating solids and liquids. Examples of such suitable techniques include, but are not limited to decantation, centrifugation, and filtration, but excluding techniques such as evaporation and distillation. The intermediate solid is then dried to form a precursor. The drying may be performed as described above.

The precursor is pyrolzyed at 600 to 1000° C., preferably 625 to 975° C., preferably 650 to 950° C., preferably 675 to 925° C., preferably 700 to 900° C., preferably 725 to 875° C., preferably 750 to 850° C., preferably 775 to 825° C., preferably 800° C. to form the activated carbon sorbent. In some embodiments, the pyrolyzing is performed in an inert atmosphere. Such an inter atmosphere may be provided by any suitable inert gas, such as nitrogen, helium, argon, neon, and the like. The pyrolyzing may be performed under a static atmosphere, or a dynamic atmosphere, e.g. flowing inert atmosphere. In some embodiments, the pyrolyzing is performed under vacuum. Such a vacuum may be a static vacuum or a dynamic vacuum. In some embodiments, the pyrolyzing is performed for 1 to 12 hours, preferably 1.5 to 10 hours, preferably 2 to 8 hours, preferably 2.5 to 7 hours, preferably 3 to 6 hours, preferably 3.5 to 5 hours, preferably 4 hours.

In some embodiments, the activated carbon sorbent has a mean pore volume of 0.400 to 0.525 cc $g^{-1}$, preferably 0.405 to 0.510 cc $g^{-1}$, preferably 0.410 to 0.500 cc $g^{-1}$, preferably 0.415 to 0.490 cc $g^{-1}$, preferably 0.420 to 0.485 cc $g^{-1}$, preferably 0.425 to 0.480 cc $g^{-1}$, preferably 0.430 to 0.475 cc $g^{-1}$, preferably 0.435 to 0.470 cc $g^{-1}$, preferably 0.440 to 0.465 cc $g^{-1}$, preferably 0.445 to 0.460 cc $g^{-1}$, preferably 0.450 to 0.455 cc $g^{-1}$. In some embodiments, the activated carbon sorbent has a mean surface area of 1000 to 1250 $m^2/g$, preferably 1025 to 1225 $m^2/g$, preferably 1050 to 1200 $m^2/g$, preferably 1075 to 1175 $m^2/g$, preferably 1100 to 1150 $m^2/g$, preferably 1115 to 1125 $m^2/g$. In some embodiments, the activated carbon sorbent has a has a point of zero charge pH ($pH_{zpc}$) of 8 to 11.5, preferably 8.25 to 11, preferably 8.5 to 10.5, preferably 8.75 to 10, preferably 9 to 9.75, preferably 9.25 to 9.5, preferably 9.4 to 9.475.

In some embodiments, the activated carbon sorbent is in the form of particles. In general, the particles may have any shape known to one of ordinary skill in the art. Examples of suitable shapes the activated carbon sorbent particles may take include spheres, spheroids, lentoids, ovoids, solid polyhedra such as tetrahedra, cubes, octahedra, icosahedra, dodecahedra, hollow polyhedra, stellated polyhedral (both regular and irregular), triangular prisms, hollow spherical shells, tubes, sheets, platelets, disks, rods, blocks, flakes, granules, angular chunks, and mixtures thereof. In some embodiments, the particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of particles having a different shape. As used herein, the term "non-uniform shape" refers to an average consistent shape that differs by more than 10% of the distribution of particles having a different shape.

In some embodiments, the particles have a mean particle size of 50 to 5000 μm, preferably 75 to 4750 μm, preferably 100 to 4500 μm, preferably 125 to 4250 μm, preferably 150 to 4000 μm, preferably 175 to 3750 μm, preferably about 200 to 3500 μm. In embodiments where the particles are spherical, the particle size may refer to a particle diameter. In embodiments where the particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the particles have an anisotropic shape such as rods, the particle size may refer to a length of the rod, a width of the rod, an average of the length and width of the rod. In some embodiments in which the particles have non-spherical shapes, the particle size refers to the diameter of a sphere having an equivalent volume as the particle. In some embodiments in which the particles have non-spherical shapes, the particle size refers to the diameter of a sphere having an equivalent diffusion coefficient as the particle.

In some embodiments, the particles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the particles of the present disclosure are monodisperse having a particle size distribution ranging from 80% of the average particle size to 120% of the average particle size, preferably 90-110%, preferably 95-105% of the average particle size. In some embodiments, the particles are not monodisperse.

In some embodiments, the particles comprise a 3D framework of activated carbon. This 3D framework may comprise structural members made of activated carbon and a network of pores formed by the structural members. The pores may have any suitable shape, such as spherical, elliptical, polyhedral, or combinations or portions thereof. The pores may have an arrangement which is ordered or disordered. The 3D framework may comprise an ordered arrangement of structural members. Alternatively, the 3D framework may comprise a disordered arrangement of structural members. The 3D framework may have a total volume which is a sum of a structural member volume and a pore volume. The structural member volume refers to a total volume of the 3D framework which is taken up by the structural members. Similarly, the pore volume refers to a total volume of the 3D framework which is taken up by the pores. In some embodiments, the structural member volume is larger than the pore volume. In some embodiments, the pore volume is larger than the structural member volume. In some embodiments, the structural member volume and the pore volume are substantially the same (i.e. within about 10%, preferably within about 5%).

The pores may be monodisperse, that is having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the pores are not monodisperse.

In some embodiments, the 3D framework causes the particles to have a surface which is defined by cavities, incomplete or partial pores, ridges, ripples, undulations, or other non-smooth or non-uniform textures.

In some embodiments, the activated carbon sorbent comprises 70 to 92.5 wt % carbon, preferably 72.5 to 90 wt % carbon, preferably 75 to 87.5 wt % carbon, preferably 77.5 to 85 wt % carbon, preferably 78 to 83 wt % carbon, preferably 79 to 82 wt % carbon, preferably 79.5 to 81.5 wt % carbon, preferably 80 to 81 wt % carbon, preferably 80.5 wt % carbon, based on a total weight of activated carbon sorbent. In some embodiments, the activated carbon sorbent comprises 7 to 23 wt % oxygen, preferably 8 to 22 wt % oxygen, preferably 9 to 21 wt % oxygen, preferably 10 to 20 wt % oxygen, preferably 11 to 19 wt % oxygen, preferably 12 to 18 wt % oxygen, preferably 12.5 to 17.5 wt % oxygen, preferably 13 to 17 wt % oxygen, preferably 13.5 to 16.5 wt % oxygen, preferably 14 to 16 wt % oxygen, preferably 14.5 to 15.5 wt % oxygen, preferably 15 to 15.25 wt % oxygen, based on a total weight of activated carbon sorbent. In some embodiments, the activated carbon sorbent comprises 1 to 5 wt % calcium, preferably 1.25 to 4.5 wt % calcium, preferably 1.5 to 4 wt %, calcium, preferably 1.75 to 3 wt % calcium, preferably 2.0 to 2.5 wt % calcium, preferably 2.1 to 2.3 wt % calcium, preferably 2.2 wt % calcium, based on a total weight of activated carbon sorbent. In some embodiments, the activated carbon sorbent comprises 1 to 5 wt % magnesium, preferably 1.25 to 4 wt % magnesium, preferably 1.5 to 3 wt % magnesium, preferably 1.75 to 2.5 wt % magnesium, preferably 1.8 to 2 wt % magnesium, preferably 1.9 wt % magnesium, based on a total weight of activated carbon sorbent. In some embodiments, the activated carbon sorbent comprises 0.1 to 0.9 wt % potassium, preferably 0.15 to 0.8 wt % potassium, preferably 0.2 to 0.7 wt % potassium, preferably 0.25 to 0.6 wt % potassium, preferably 0.3 to 0.5 wt % potassium, preferably 0.35 to 0.45 wt % potassium, preferably 0.4 wt % potassium, based on a total weight of activated carbon sorbent.

The present disclosure also relates to a method for removing an organic pollutant from a contaminated water using the activated carbon sorbent described above. In some embodiments, only one organic pollutant is present in the water. In alternative embodiments, a plurality of organic pollutants is present in the water. The method involves contacting the contaminated water with the activated carbon sorbent with water containing one or more organic pollutants to form a saturated sorbent and separating the saturated sorbent from the purified water.

In some embodiments, the organic pollutants may be a dye, a phenol, a polycyclic aromatic hydrocarbon, an herbicide, a pesticide, a persistent organic pollutant, or the like. In some embodiments, the organic pollutant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthraquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FlAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red 0, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythrosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

In some embodiments, the organic pollutant is a phenolic compound. A phenol is an organic compound having a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, dimethylphenols (also called xylenols, including 2,3-dimethylphenol, 2,4-dimethylphenol, 2,5-dimethylphenol, 2,6-dimethylphenol, 3,4-dimethylphenol, and 3,5-dimethylphenol), diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorphacinone, pindone, difethialone, cholecalciferol, ergocalciferol, ANTU, chloralose, crimidine, 1,3-difluoro-2-propanol, endrin, fluoracetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

In an especially preferred embodiment the organic pollutant is a phenol such as 2,4-dimethylphenol (DMP) and 2,4-dichlorophenol (DCP).

In some embodiments, the activated carbon sorbent may be free flowing or supported on or within a substrate, for example, a column. Examples of supported activated carbon sorbents include materials and geometries where the activated carbon sorbent is supported within a fixed bed, a static packed bed, a fluidized bed, embedded in a porous support (such as a porous polymer matrix), in or on a ceramic support, in or on a polymer support, or in or on a silica support. In some embodiments, the activated carbon sorbent is used in an amount of 5 to 15 mg, preferably 6 to 14 mg, preferably 7 to 13 mg, preferably 8 to 12 mg, preferably 9 to 11 mg, preferably 10 mg per mg of organic pollutant. In some embodiments, the activated carbon sorbent is employed in an amount of 50 to 400 mg/L, preferably 75 to 350 mg/L, preferably 100 to 300 mg/L, preferably 125 to 275 mg/L, preferably 150 to 250 mg/L, preferably 175 to 225 mg/L, preferably 200 mg/L of contaminated water.

In some embodiments, the method involves addition of the activated carbon sorbent to the contaminated water to have an organic pollutant be removed to form a purification mixture. In some embodiments, the purification mixture is shaken, stirred, agitated, or other method of achieving temporary homogeneity of the purification mixture. In preferred embodiments, the purification mixture is shaken at 10 to 1000 rpm, preferably 50 to 500 pm, preferably 125 to 250 rpm, preferably 150 rpm.

In alternative embodiments, the contacting comprises delivering a mixture into a feed side of a chamber comprising the activated carbon sorbent that divides the chamber into the feed side and a permeate side, such that at least a portion of the contaminated water permeates the activated carbon sorbent and recovering from the permeate side purified water depleted in the organic pollutant compared to the contaminated water supplied to the feed side. The chamber used for the present method may be of any shape so long as the activated carbon sorbent can be securely housed and utilized inside the chamber to accomplish the removal of the organic pollutant. The chamber may also include an inlet configured to accept feed material, a first outlet configured to expel a permeate, and an optional second outlet configured to expel a retentate. The chamber can be configured to be pressurized so as to push feed material though the inlet, permeate through the first outlet and optionally, retentate through the second outlet. The chamber can alternatively be configured to operate at reduced pressure as to pull feed material through the inlet, permeate out through the first outlet and optionally, retentate out through the second outlet. The chamber may also include a pump to provide a force for moving water from the feed side to the permeate side. In one or more embodiments, a force is provided to deliver the water into contact with the activated carbon sorbent. The contaminated water may have a flow rate of 0.001 L/min to 1,000 L/min, 0.005 L/min to 500 L/min, 0.01 L/min to 100 L/min, 0.05 L/min to 10 L/min, 0.1 L/min to 5 L/min, or 0.5 L/min to 2 L/min. Alternatively, the contaminated water may stay stagnant over the activated carbon sorbent or be stirred, shaken, or agitated as previously described.

In some embodiments, the water used in the method has a temperature of 1 to 99° C., preferably 20 to 90° C., preferably 21 to 75° C., preferably 25 to 50° C. In some embodiments, the water has a pH of 2 to 10, preferably 4 to 8, preferably 5.6 to 7. In some embodiments, the water and the activated carbon sorbent are in contact for 5 to 3000 minutes, preferably 60 to 2500 minutes, preferably 100 to 1500 minutes.

In some embodiments, the contacting is performed by passing the contaminated water through the activated carbon sorbent. In some embodiments, the activated carbon sorbent may be used in series with other currently known adsorption materials to enhance the removal of an organic pollutant from water or to remove a different type of impurity from water that is not an organic pollutant.

In terms of the present disclosure, the adsorption interaction between the organic pollutant and the activated carbon sorbent may be chemisorption, physisorption, or mixtures thereof. In at least one embodiment, organic pollutant is adsorbed onto the activated carbon sorbent via a physisorption process, meaning the process is primarily physical and preferably no chemical changes occur on the activated carbon sorbent or organic pollutant.

In some embodiments, the method removes 80 to 99.9%, preferably 81 to 99.5%, preferably 82.5 to 99.0%, preferably 85 to 97.5%, preferably 87.5 to 96%, preferably 90 to 95% of an initial amount of organic pollutant present in the contaminated water. In some embodiments, the purified water has least 25% less organic pollutant than that present in the water before contact with the activated carbon sorbent, preferably at least 30% less, preferably at least 40% less, preferably at least 50% less, preferably at least 60% less, preferably at least 70% less, preferably at least 80% less, preferably at least 90% less, preferably at least 95% less than that present in the water before contact with the activated carbon sorbent. In a preferred embodiment, the purified water is substantially free of the organic pollutant, for example, the stream contains less than 10 ppm, preferably less than 1 ppm, preferably less than 100 ppb, preferably less than 1 ppb, preferably less than 0.1 ppb, preferably less than 1 ppt of the organic pollutant. In a most preferred embodiment, the purified water is devoid of the organic pollutant.

In some embodiments, the method of the present disclosure further involves sonicating the saturated sorbent in an aqueous alcohol solution to form a regenerated sorbent. The regenerated sorbent may be substantially similar to the activated carbon sorbent described above. The regenerated sorbent may be used in the method of removing an organic pollutant described above (reuse). In general, the aqueous alcohol solution may comprise any suitable water miscible alcohol, examples of which include but are not limited to methanol, ethanol, n-propanol, isopropanol, t-butanol, ethylene glycol, propylene glycol, and glycerol. The activated carbon sorbent of the present disclosure may be regenerated and retain greater than 75%, preferably greater than 80%, preferably greater than 85%, preferably greater than 87.5%, preferably greater than 90%, preferably greater than 92.5%, preferably greater than 95%, preferably greater than 97.5%, preferably greater than 99% of an initial adsorption capacity (e.g. the organic pollutant uptake capacity) after 2 to 4 regeneration cycles. In some embodiments, the activated carbon sorbent retains the percentage of initial adsorption capacity after up to 10 cycles, preferably up to 15 cycles, preferably up to 25 cycles, preferably up to 50 cycles, preferably up to 100 cycles, preferably up to 150 cycles, preferably up to 200 cycles, preferably up to 250 cycles, preferably up to 300 cycles, preferably up to 350 cycles, preferably up to 400 cycles, preferably up to 500 cycles, preferably up to 625 cycles, preferably up to 750 cycles, preferably up to 1,000 cycles.

The examples below are intended to further illustrate protocols for the preparation, characterization, and use of the activated carbon sorbent and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

Examples

Materials 2,4-Dimethylphenol (DMP) and 2,4-Dichlorophenol (DCP) were selected as representative phenolic compound pollutants. They were an analytical reagent (AR) grade and purchased from Chem Service, Inc., USA. Acetonitrile HPLC grade solvent purchased from Fisher Scientific, Germany, was used as mobile phase. Other chemicals (i.e. potassium hydroxide, sodium hydroxide, nitric acid and sodium chloride) were purchased from Merck, Germany. Deionized (DI) water was used for the adsorption optimization experiments. Coconut activated carbon (AC) was purchased from Cenapro Chemical Corporation, Philippines. Carbon nanotubes (CNTs) was purchased from Timesnano Company, China.

Analytical Method

A high performance liquid chromatography coupled with a diode array detector (HPLC-DAD) (Agilent 1200 Series, USA) was used to quantify the concentration of DMP and DCP, at 220 nm wavelength, in their solutions before and after the adsorption experiments. The used mobile phase was Acetonitrile:Water (70:30 v/v) with a flow rate of 1 mL min$^{-1}$. The used chromatographic column was C18 (Waters Symmetry®, 250×4.6 mm, 5 µm).

Preparation and Characterization of Adsorbent

The collected *H. uninervis* seagrass (SG) was washed thoroughly with tap water and then with distilled water to remove the water-soluble impurities. The washed material was dried in an oven at 70° C. for 24 h. 20 g of the dried seagrass was soaked in 500 mL of 0.5 M potassium hydroxide (KOH) solution and it was continuously stirred with a magnetic stirrer for 24 h. After that, the solution was filtered with Whatman 42 GF/F filter paper. The filtered solid was dried in an oven at 70° C. for 24 h. Later, the dried solid was thermally treated, in a tube furnace, at 800° C. under $N_2$ atmosphere for 4 h. After pyrolysis, the resulting activated carbon (SGAC) was washed thoroughly with DI water and 2% ethanol, then dried at 70° C. for 24 h. The prepared adsorbent was preserved in a tightly closed vial for characterization and used in the adsorption experiments. A Fourier Transform Infrared Spectroscopy (FTIR) (Nicolet 6700 Thermo Electron) instrument was used to characterize the functional groups on the surface of SG and SGAC adsorbents. The point of zero charge pH (pHzpc) was measured by mixing 50 mg of adsorbent in 20 mL of 0.5 M NaCl solutions at different pH (2-10) values for 24 h at room temperature. A pH meter (OAKTON PC2700) was used to measure the initial and final pH. A thermal gravimetric analyzer (TGA Q500, TA Instruments) was used at a heating rate of 10° C. min$^{-1}$ and a flow rate of 40 mL min$^{-1}$ to study the thermal degradation of 10 mg of adsorbents under nitrogen atmosphere. In order to characterize the adsorbents' surface morphology and elemental composition, the seagrass before and after carbonization was placed on aluminum stubs and sputter-coated with gold using a DESK V HP TSC Cold Sputter Coater and then subjected to a Field Emission-Scanning Electron Microscope (FE-SEM) coupled with an Energy Dispersive X-ray Spectroscopy (EDX) (Jeol 6700LV) examination. The automated gas sorption analyzer (AutosorbiQ Quantachrome USA) was used to analyze the surface area and porosity of the adsorbents. The liquid nitrogen adsorption-desorption isotherms were measured after degassing all the adsorbents at 200° C. to a pressure of $6.5 \times 10^{-5}$ Torr. The Brunauer-Emmett-Teller (BET) and the density functional theory (DFT) methods were used to calculate the surface area (SA) and total pore volume (V) respectively.

Adsorption Experiments

The batch adsorption mode was used to study the effect of pH, weight of adsorbents, concentration of phenolic compounds, contact time and temperature on the removal of DMP and DCP compounds from aqueous media. In the pH experiment, 5 mg of adsorbent was added to 10 mL of solutions having different pH values (i.e. 2-10) and 20 mg L$^{-1}$ of DMP or DCP adsorbate, then kept at a fixed temperature (24° C.), with a shaking speed of 140 rpm and a contact time of 24 h. In order to study the adsorbent loaded mass effect on the removal efficiency, different masses of SGAC adsorbent (5-200 mg) were added to a 100 mL of solution which had a fixed concentration (200 mg L$^{-1}$) of adsorbate and a pH of 5.76. The resulting solutions were continuously shaken and at a speed of 140 rpm at 24° C. for 24 h. For studying the effect of contact time, a fixed adsorbent dose was added to the solutions having different DMP and DCP concentrations and a fixed pH (5.76) value and temperature (24° C.). They were then shaken at different time intervals (i.e. 15, 30, 60, 120, 240, 360, 1440 and 2880 min). To investigate the adsorption isotherms of DMP and DCP onto the prepared adsorbent, different DMP and DCP concentrations having a fixed pH (5.76) and adsorbent dose (0.1 g L$^{-1}$) were prepared and shaken for 24 h at a constant temperature (24° C.) and shaking speed (140 rpm). The removal efficiency and adsorption capacity ($q_e$) are calculated using Eqs. (1) and (2) respectively.

$$\text{Removal \%} = \frac{C_0 - C_e}{C_0} \times 100 \quad (1)$$

$$q_e = \frac{V(C_0 - C_e)}{m} \quad (2)$$

where qe is the adsorption capacity in mg g$^{-1}$, $C_0$ and $C_e$ are respectively, the initial and final adsorbate concentration in mg L$^{-1}$. V is the volume of solution in Liters and m is the adsorbent mass in grams. The obtained adsorption results at equilibrium were tested with the most frequently used adsorption isotherms (Freundlich, Langmuir and Temkin) and kinetics models (i.e. pseudo-first-order (PFO), pseudo-first-order (PSO), Elovich and Intra-particle diffusion) presented in Table 1 below.

TABLE 1

Linear forms of the most frequently used adsorption isotherms and kinetics models

| Model | Linear Equation | Plot |
|---|---|---|
| Isotherm | | |
| Langmuir | $\frac{C_e}{q_e} = \frac{1}{bQ_{max}} + \frac{C_e}{Q_{max}}$ | $\frac{C_e}{q_e}$ vs $C_e$ |
| Freundlich | $\ln(q_e) = \ln(K_f) + \frac{1}{n}\ln(C_e)$ | $\ln(q_e)$ vs $\ln(C_e)$ |
| Temkin | $q_e = \frac{RT}{b_T}\ln(A_T) + \frac{RT}{b_T}\ln(C_e)$ | $q_e$ vs $\ln + (C_e)$ |
| Kinetics | | |
| Pseudo-First order (PFO) | $\ln(q_e - q_t) = \ln(q_e) - k_1 t$ | $\ln(q_e - q_e)$ vs t |
| Pseudo-Second order (PSO) | $\frac{t}{q_t} = \frac{1}{q_e^2 k_2} + \frac{t}{q_e}$ | $\frac{t}{q_t}$ vs t |
| Elovich | $q_t = \frac{1}{b}\ln(ab) + \frac{1}{b}\ln(t)$ | $q_t$ vs $\ln(t)$ |
| Intra-particle diffusion | $q_t = k_{id} t^{0.5} + C$ | $q_t$ vs $t^{0.5}$ |

The effect of temperature on the DMP and DCP adsorption onto the prepared adsorbent was investigated at different temperatures (i.e. 24, 35, 45 and 55° C.) and a fixed pH (5.76), concentration (20 mg L$^{-1}$) of DMP or DCP, adsorbent dose (0.2 g L$^{-1}$) and contact time (24 h). The equilibrium adsorption data was used to calculate the adsorption distribution coefficient ($K_d$) as follows:

$$K_d = \frac{q_e}{C_e} \quad (3)$$

The adsorption thermodynamics ($\Delta H$, $\Delta S$ and $\Delta G$) were calculated using the following equations:

$$LnK_d = \frac{\Delta S^0}{R} - \frac{\Delta H^0}{RT} \quad (4)$$

$$\Delta G_0 = \Delta H - T\Delta S \quad (5)$$

Application and Regeneration of Adsorbent

The regeneration experiments were performed using 0.2 g L$^{-1}$ of adsorbent dose, 20 mg L$^{-1}$ concentration of each DMP and DCP in synthetic wastewater (Glucose 500 mg L$^{-1}$, sodium acetate 500 mg L$^{-1}$, Methanol 0.5 mg L$^{-1}$, potassium dihydrogen phosphate 370 mg L$^{-1}$, dipotassium hydrogen phosphate 250 mg L$^{-1}$, ammonium chloride 120 mg L$^{-1}$, and pH 6.8), 140 rpm of agitation speed, 24° C. temperature and 24 h contact time. The used SGAC adsorbent was regenerated using 5% ethanol in water solution and ultrasound sonication for 1 h. The adsorbent was then filtered, washed with distilled water and dried at 70° C. in an oven overnight. The regenerated adsorbent was then reused in four consecutive cycles of adsorption-desorption experiment.

Characterization of Adsorbent

FIG. 1 shows the FTIR spectrum of SG and SGAC adsorbents. The absorption stretching bands at around 3450 cm$^{-1}$ and 3330 cm$^{-1}$ indicate the presence of O—H and N—H corresponding to alcohol and amine functional groups respectively. The medium peaks at 2910 cm$^{-1}$ are due to stretching of C—H associated with alkane. The strong stretching peaks at 1680 cm$^{-1}$ and 1600 cm$^{-1}$ correspond to C=O and C=C in the conjugated ketone. Stretching peaks at 1110 cm$^{-1}$ and 1010 cm$^{-1}$ indicate the presence of a C—O functional group in ether and alcohol respectively. A wag peak at 900 cm$^{-1}$ corresponds to N—H in amine. Evidently, different functional groups are available which provide different potential adsorption sites for DMP and DCP molecules.

Figure 2:
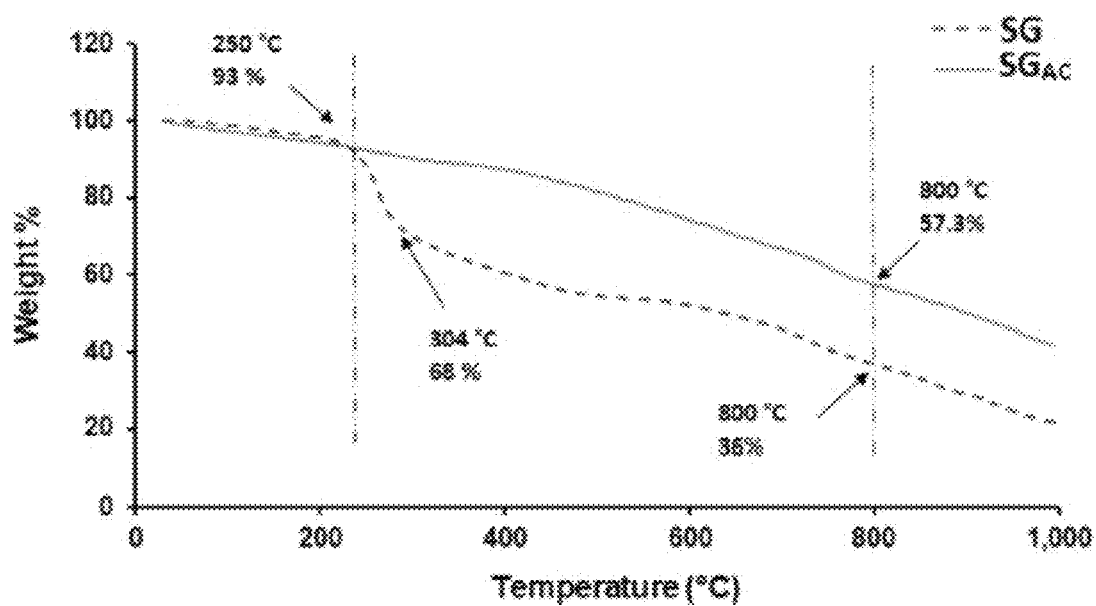
FIG. 2 shows the thermogravimetric analysis (TGA) curve dried seagrass and the activated carbon sorbent.

The thermal gravimetric analysis (TGA) was performed to estimate the percentage of weight loss of adsorbents with temperature. FIG. 2 shows the TGA results for both SG and SGAC adsorbents. It was found that both adsorbents lost 7% of their original weight after heating to 250° C. due to the evaporation of moisture and some volatile compounds. The SG lost 25% of its weight between 250 and 304° C. due to its decomposition and degradation. Further, at the applied pyrolysis temperature (800° C.), the SG lost 64% of its original weight. However, the SGAC lost only 43% at 800° C. This indicates the SGAC is thermally more stable and has more fixed carbon content than the SG adsorbent.

Figure 3:
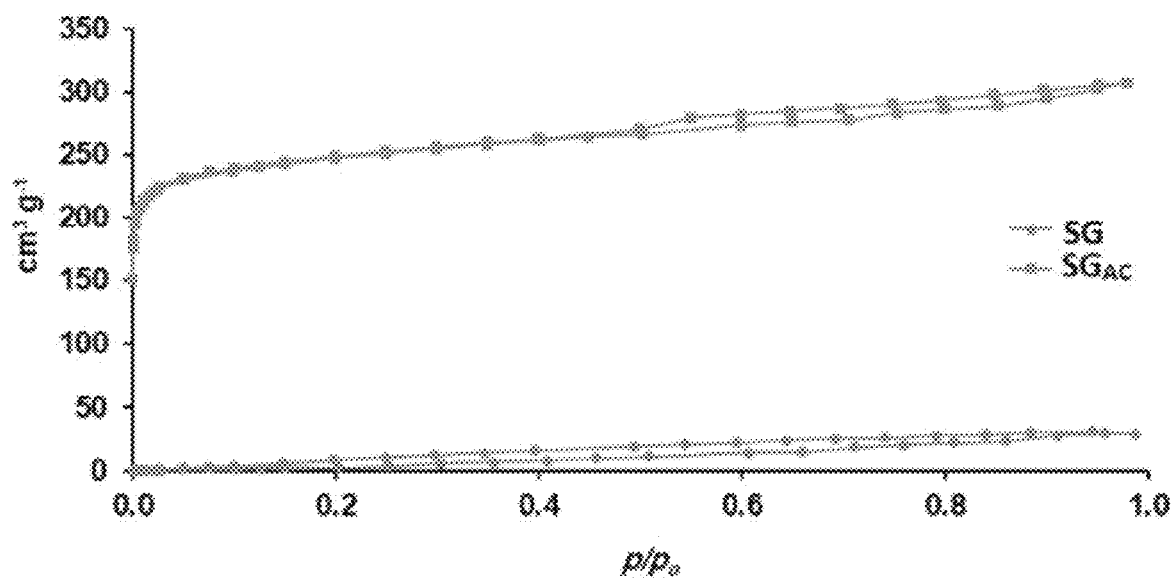
FIG. 3 shows the N2 adsorption-desorption isotherm of the dried seagrass and the activated carbon sorbent.

FIG. 3 shows the nitrogen adsorption-desorption isotherm for the SG and SGAC adsorbents. As shown, the adsorption of nitrogen onto SGAC is much higher than SG adsorbent, with a sharp increase at very low relative pressure which indicates SGAC has more micropores than SG. In addition, there is a small hysteresis for both materials due to the capillary condensation in the mesopores [Bernd R. Müller, Effect of particle size and surface area on the adsorption of albumin-bonded bilirubin on activated carbon, Carbon, 2010, 48, 12, 3607-3615, incorporated herein by reference in its entirety]. As shown in Table 2, the calculated Brunauer-Emmett-Teller (BET) surface area and pore volume of SGAC are 1118.98 m$^2$g$^{-1}$ and 0.453 cc·g$^{-1}$ respectively, which are much higher than those for SG. Eventually, these findings contribute to the explanation of the difference between the adsorption capacity of SG adsorbent before and after activation.

Figure 4:
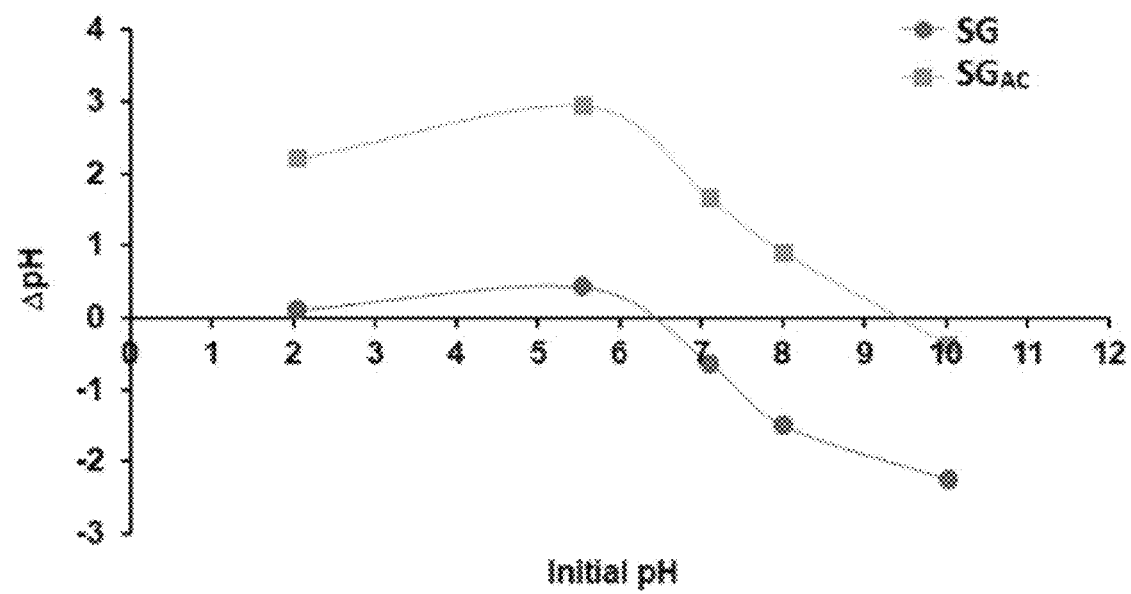
FIG. 4 shows the change in pH vs initial pH of the dried seagrass and the activated carbon sorbent.

For further characterization, the proximate composition and point of zero charge pH (pH$_{zpc}$) of the adsorbents were determined. It has been found that the volatile matter (VM) in SG materials is higher than of it in SGAC. On other hand, the fixed carbon and ash content in the SGAC are higher than SG. Additionally, the curve of $\Delta$pH versus initial pH (shown in FIG. 4) is used to determine the pHzpc of SG and SGAC, which are 6.45 and 9.45 respectively. This is attributed to the chemical activation of SG material using the potassium hydroxide and thermal pyrolysis.

TABLE 2

Surface area, proximate analysis and pH$_{zpc}$ of adsorbents

| Material | Pore volume (cc g$^{-1}$) | BET Surface area (m$^2$ g$^{-1}$) | Moisture (%) | Volatiles Matter (%) | Fixed carbon (%) | Ash (%) | pH$_{zpc}$ |
|---|---|---|---|---|---|---|---|
| SG | 0.047 | 30.951 | 6.10 | 42.70 | 46.53 | 7.52 | 6.45 |
| SG$_{AC}$ | 0.453 | 1118.98 | 7.32 | 11.46 | 69.07 | 12.20 | 9.45 |

Figure 5A:
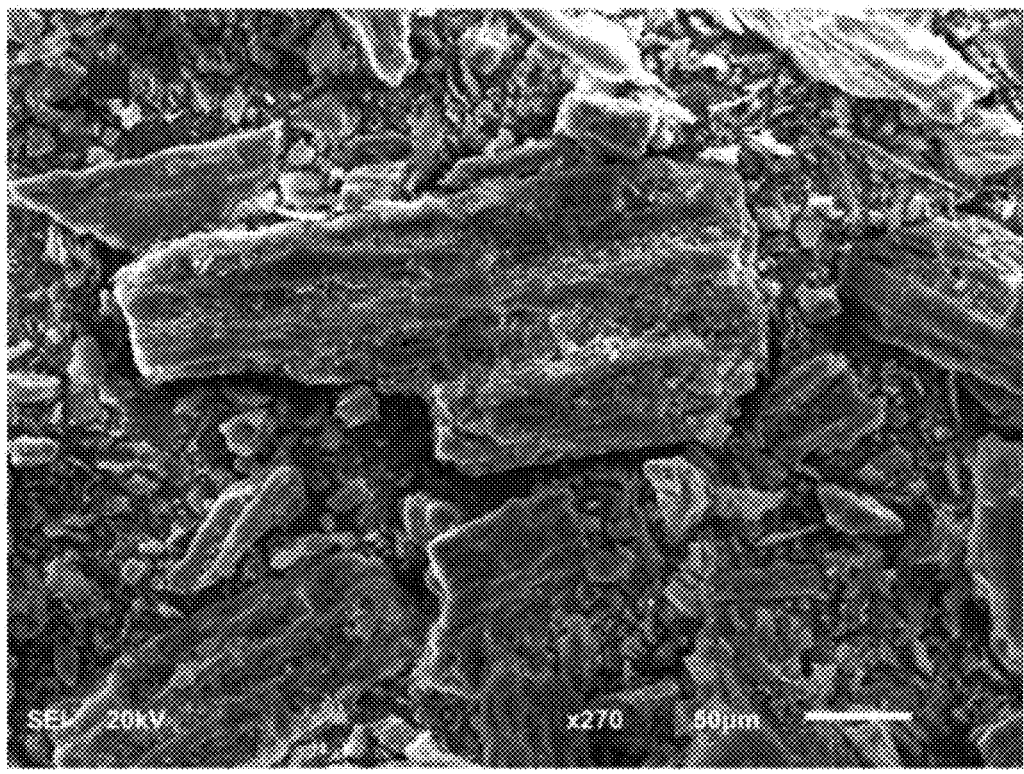
FIG. 5A is a SEM image of the dried seagrass.
Figure 5B:
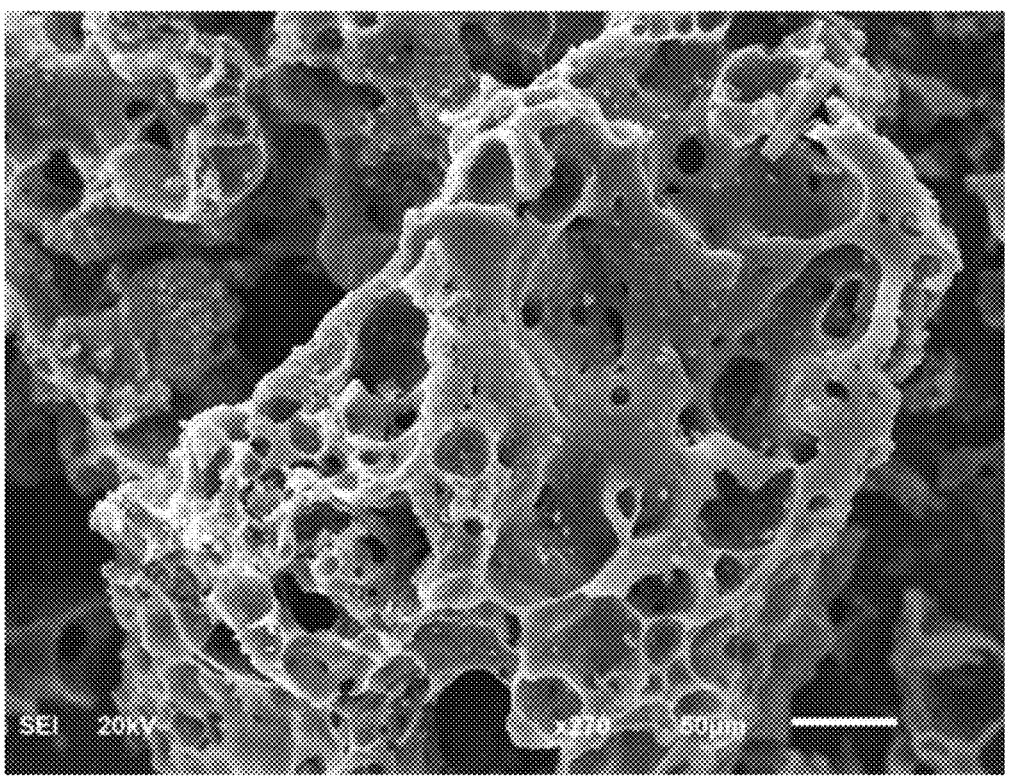
FIG. 5B is a SEM image of the activated carbon sorbent.
Figure 5C:
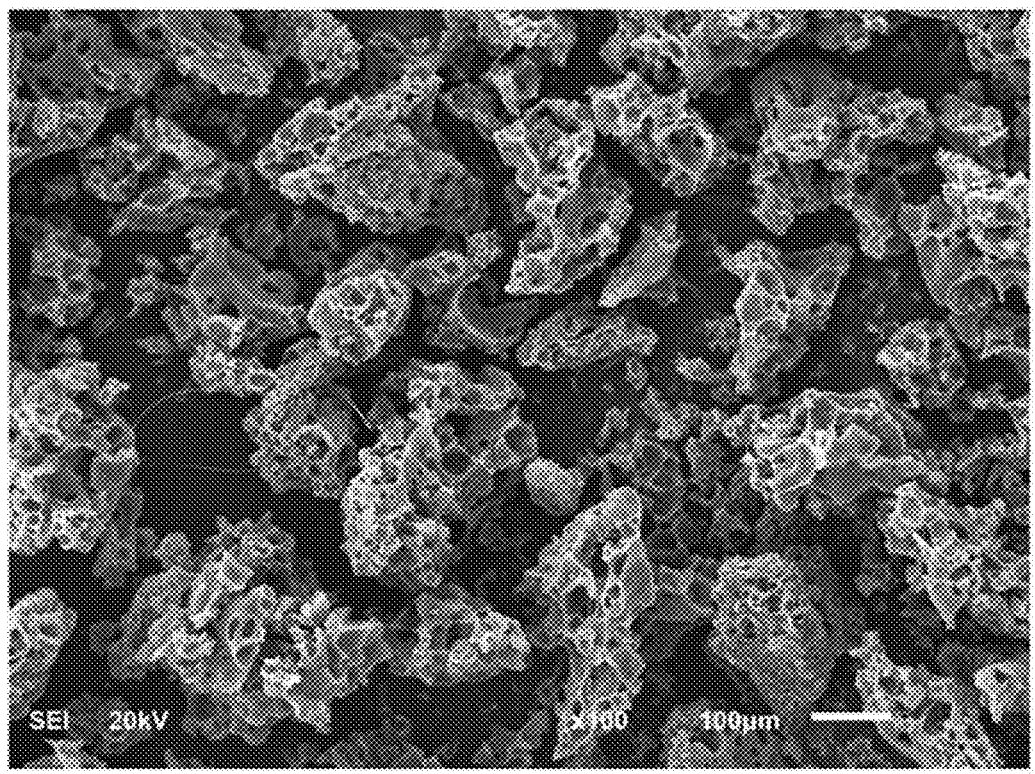
FIG. 5C is a large-scale SEM image of the activated carbon sorbent.
Figure 5D:
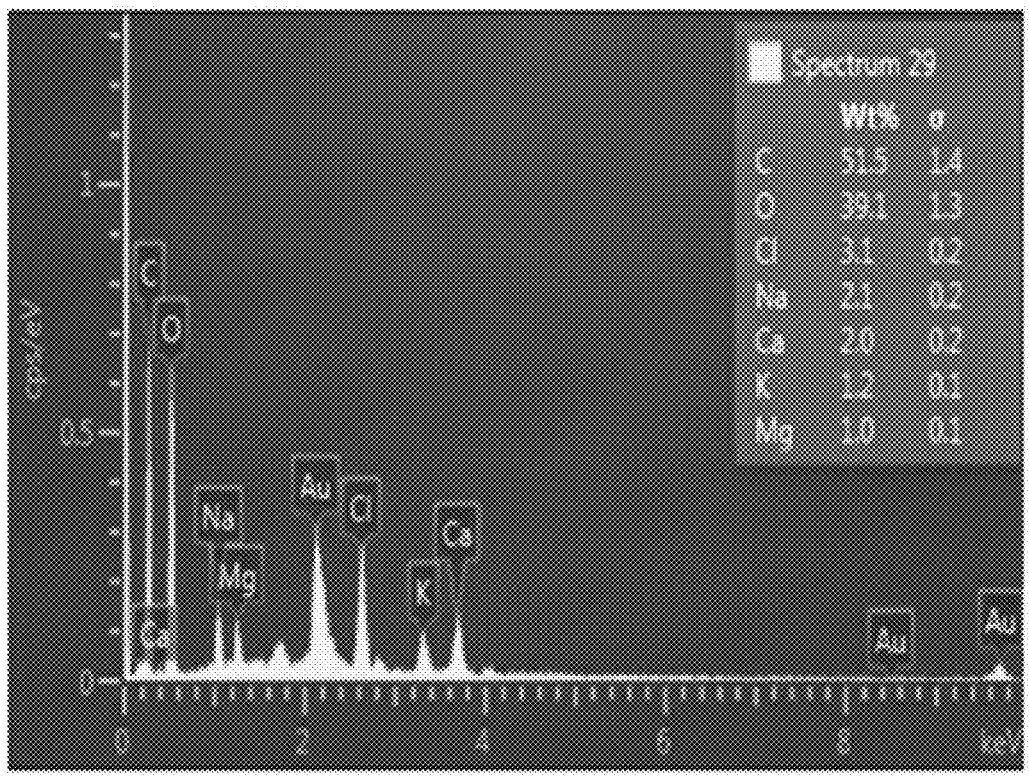
FIG. 5D is a plot of the EDX spectrum of the dried seagrass.
Figure 5E:
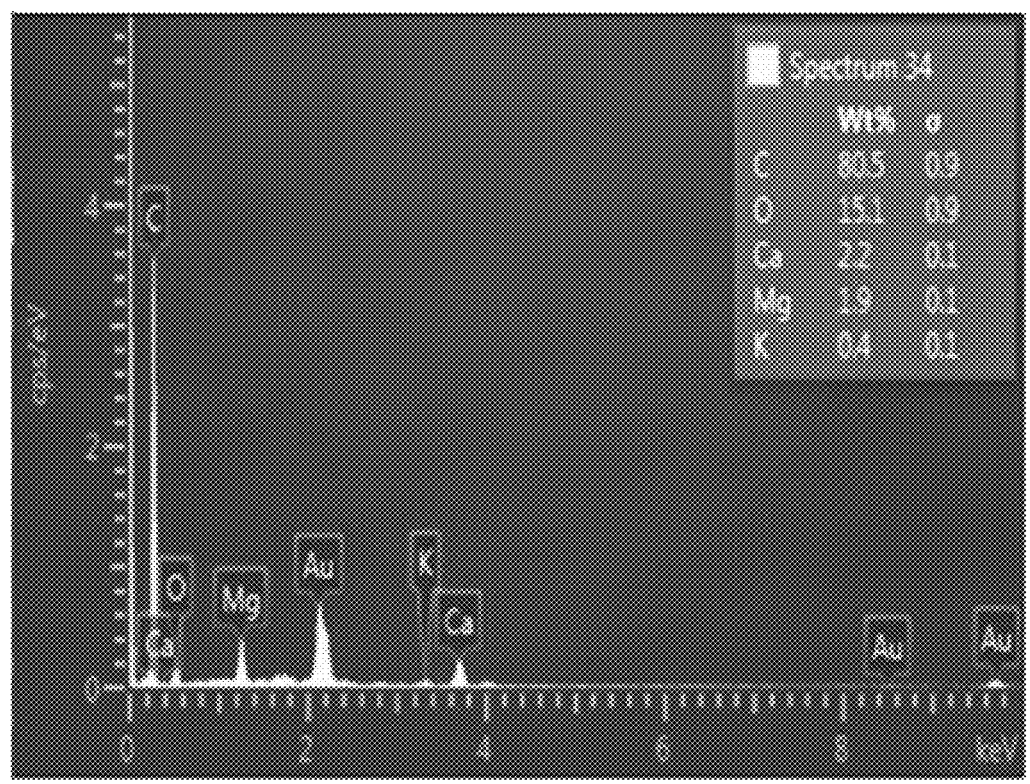
FIG. 5E is a plot of the EDX spectrum of the activated carbon sorbent.

The surface morphology of the *Halodule uninervis* adsorbent before and after pyrolysis and chemical activation is shown in FIGS. 5A and 5B-5C, respectively. The porous structure of SGAC is clearly observed due to the decomposition and volatilization of SG raw material. During the thermal pyrolysis of *Halodule uninervis*, in the presence of base, the volatile matter and the produced gases flow from the raw material very fast in a short time which leads to the splitting and shrinking of the surface of *Halodule uninervis* resulting in the formation of pores with different sizes and shapes. Also, the decomposition of bonds and the melting of some compounds in the original structure of materials can create more and large pores The elemental composition of SG and SGAC surface analysis results using EDX are shown in FIGS. 5D and 5E. It was found that carbon (51.5%) and oxygen (39.1%) are the major elements on the SG surface and the percentage of carbon (80.5%) increased significantly after pyrolysis. In addition, some element fractions of Cl, Na, Ca, K, and Mg were also detected. This indicates that carbon and oxygen are the skeleton of the SGAC adsorbent which may come from the organic compounds having oxygen-containing functional groups such as hydroxyl and carboxylic acids.

pH Effect

Figure 6:
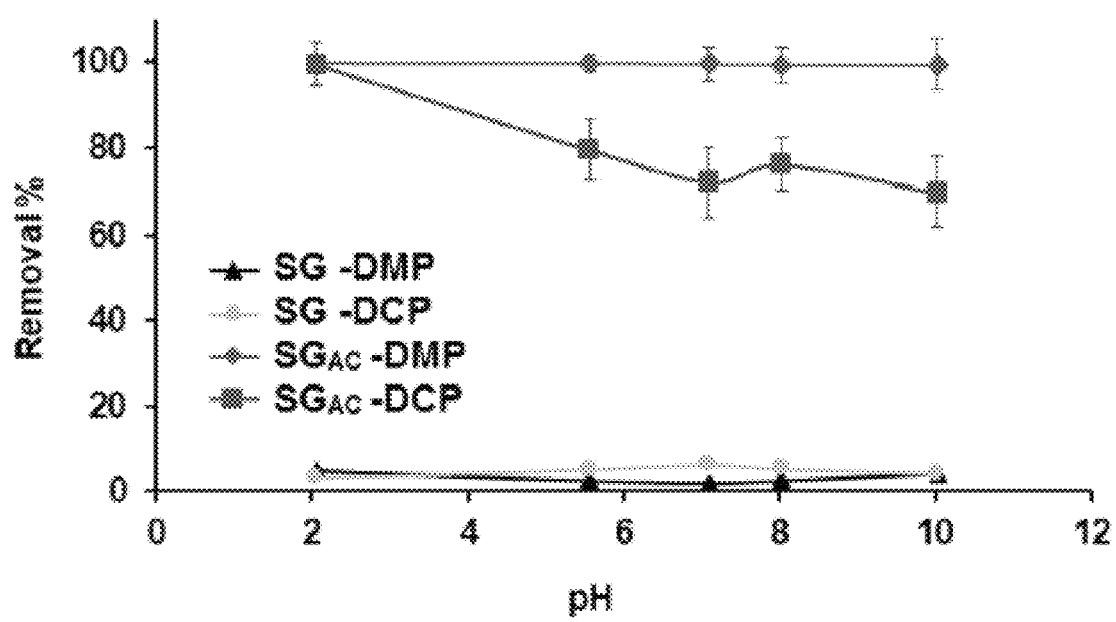
FIG. 6 is a plot of the pH effect on the removal efficiencies of seagrass (0.2 g L⁻¹) and activated carbon (0.2 g L⁻¹) adsorbents for DMP (20 mgL⁻¹) and DCP (20 mg L☐ 1) at 24° C. and shaking speed 140 rpm for 24 h.

The pH of the solution influences the molecules' charge as well as the active adsorption sites available on the surface of the adsorbents. As mentioned in the previous section, the pHzpc of SG and SGAC were found to be 6.45 and 9.45 respectively. That means at pH lower than the pHzpc, the net charge on the surface of SG and SGAC adsorbents is positive. On the other hand, the pKa values of DMP and DCP were reported to be 10.47 and 7.44 respectively, which also means that the cationic forms are the predominant at pH lower than the pKa values. Considering this fact, in the effect of the pH study and as shown in FIG. 6, it has been found that the percentage of removal of DMP, using the un-activated SG, decreases, from 5% to 2%, with increasing the pH from 2 to 7. However, at pH higher than 7 up to 10, it increases again and reaches 4.5%, while the percentage of removal of DCP increases and reaches the maximum (6%) at pH 7. After pyrolysis and activation, the percentage removal of DMP is not influenced by the pH of solution and remains around 100% in the studied range of pH (2-10). In the case of DCP, the percentage removal decreases with increasing the pH to reach around 70% at pH 10. These results indicate that the performance of SGAC adsorbent is much better than SG before activation. Therefore, in the upcoming sections, the adsorption conditions were investigated for only SGAC. Additionally, the pH (5.76) of water, without adjustment, was used in the remaining adsorption experiment.

Effect of Adsorbent Loaded Mass

Figure 7:
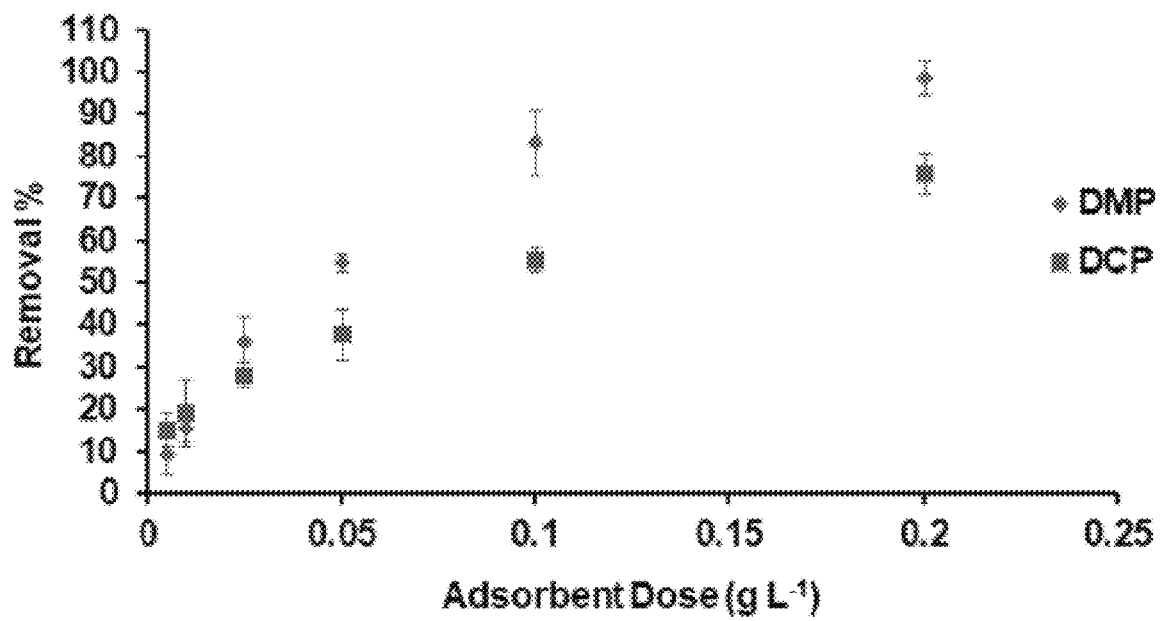
FIG. 7 is a plot of the effect of activated carbon adsorbent dose on the removal of DMP (200 mg L⁻¹) and DCP (200 mg L⁻¹) at 24° C. and shaking speed 140 rpm for 24 h.

FIG. 7 shows the effect of the added SGAC adsorbent dose on the removal of DMP and DCP molecules. It has been found the maximum removal efficiencies of 99% and 80% for DMP and DCP respectively, are obtained using 0.2 g L$^{-1}$ of adsorbent. This is attributed to the increase of active adsorption sites by increasing the adsorbent mass. Additionally, the difference between the DMP and DCP removal efficiency might be attributed to the charge density on the benzene ring, which is influenced by the nature of substituents present, whereas, the methyl group is a weak releasing group while the Cl group is a weak withdrawing group. Subsequently, the electrostatic interaction between these molecules and the adsorbent is changed.

Effect of Contact Time

Figure 8A:
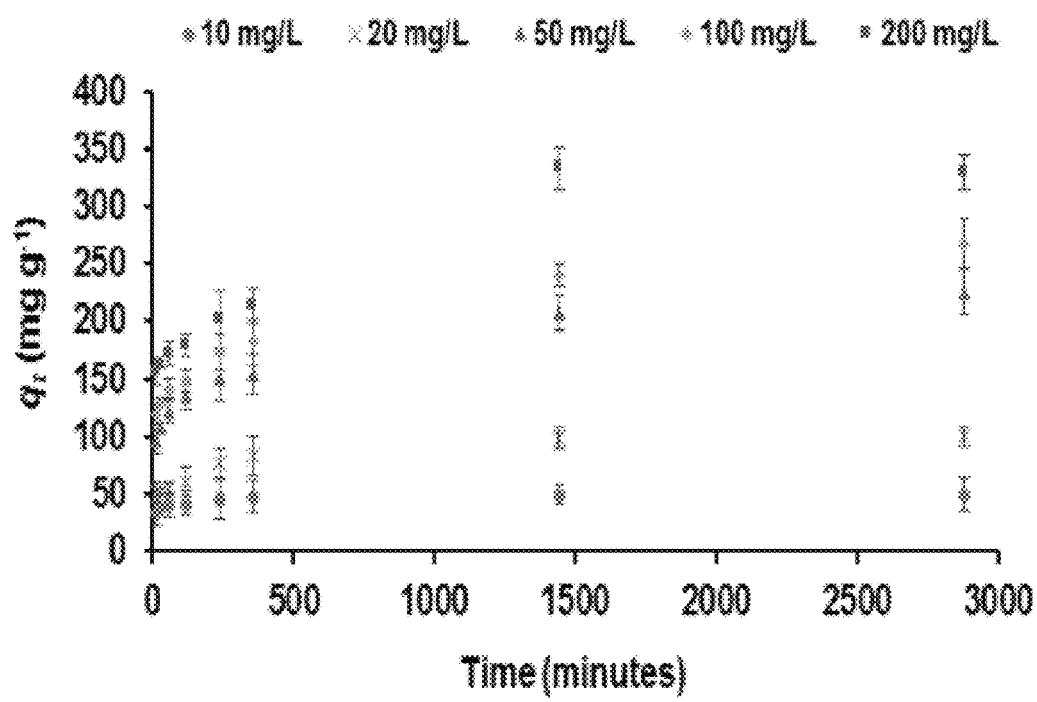
FIGS. 8A-8B are plots of the Effect of contact time on the adsorption capacities of activated carbon adsorbent at different concertation of pollutants at 24° C. and pH of solution of 5.76 where
Figure 8B:
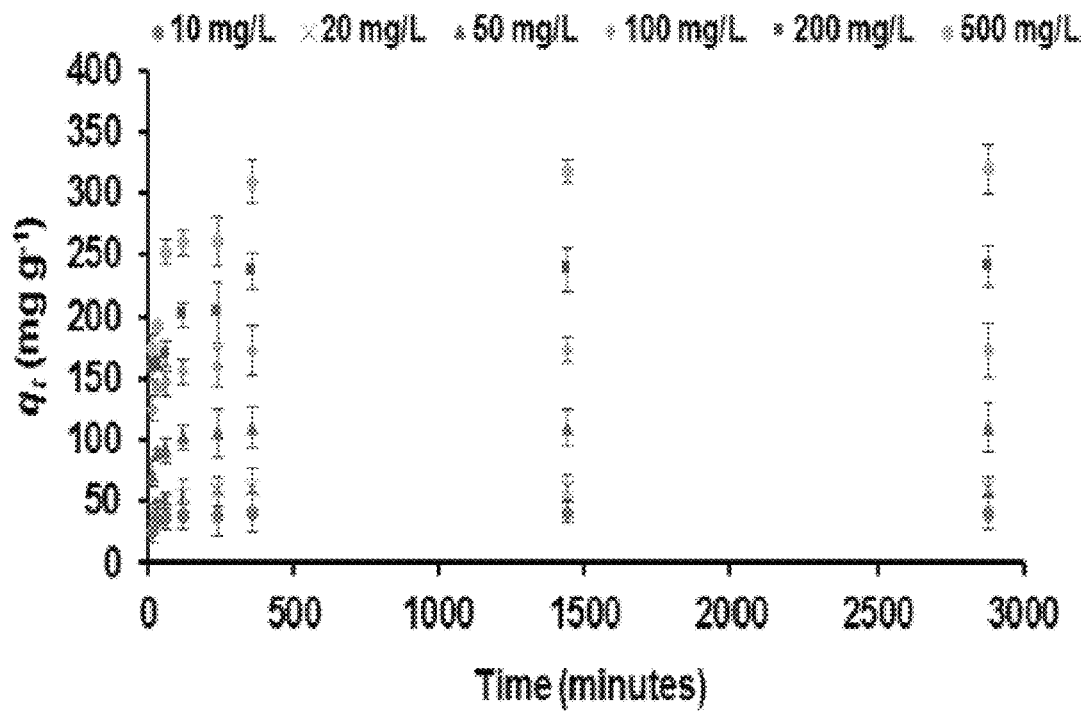
Figure 9A:
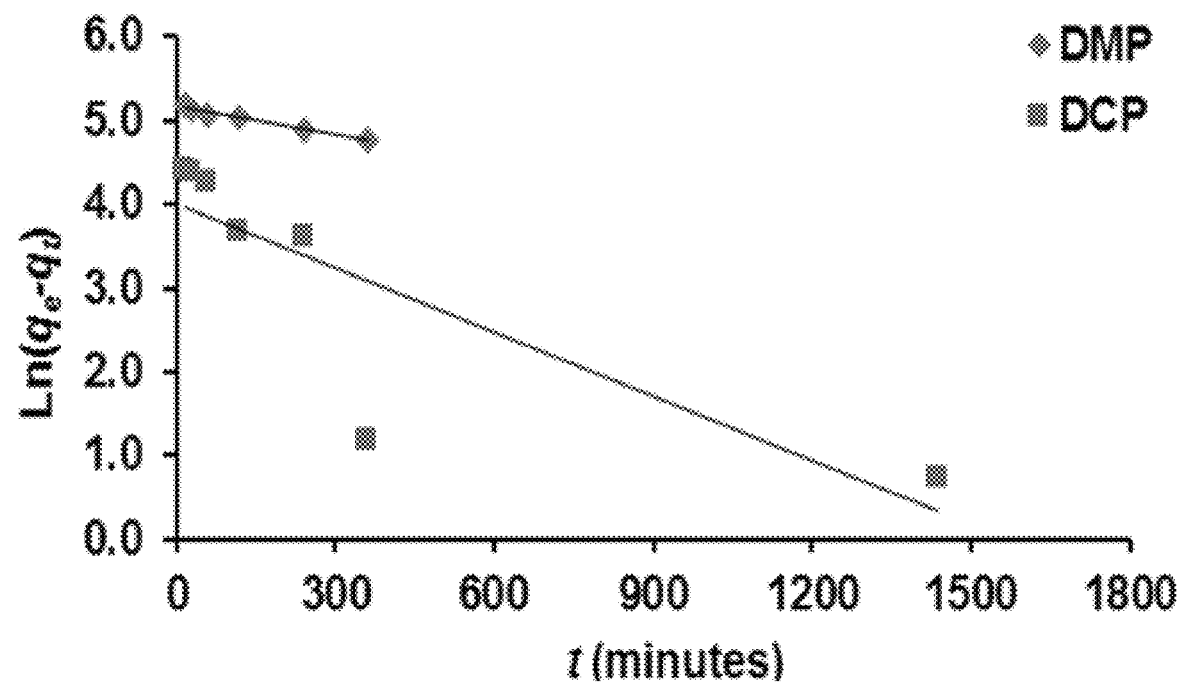
FIGS. 9A-9D are linearized plots fitting the DMP (200 mg L⁻¹) and DCP (200 mg L⁻¹) adsorption data using different adsorption kinetics models PFO (FIG. 9A), PSO (FIG. 9B), Elovich (FIG. 9C), and Intra-particle diffusion (FIG. 9D) at 24° C.
Figure 9B:
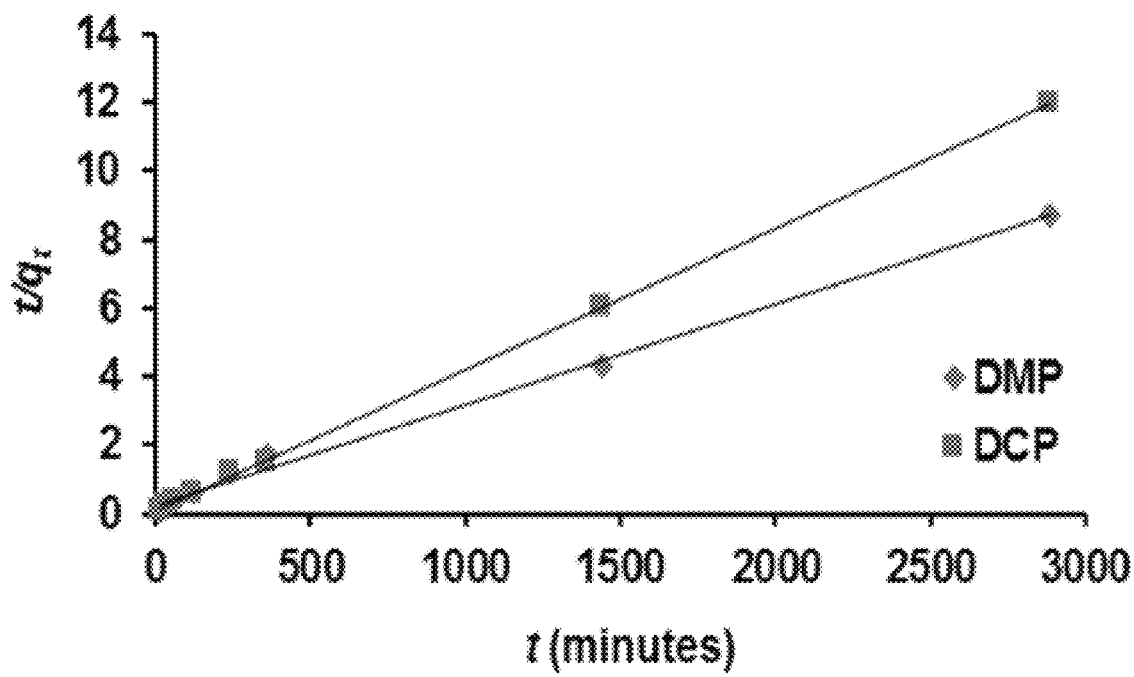
Figure 9C:
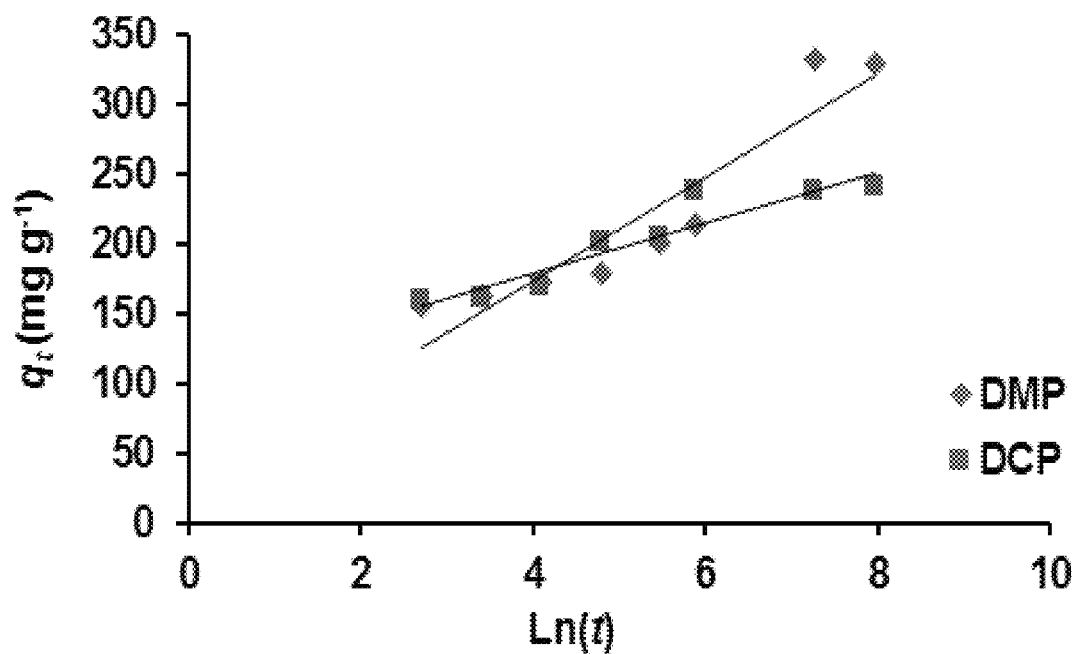
Figure 9D:
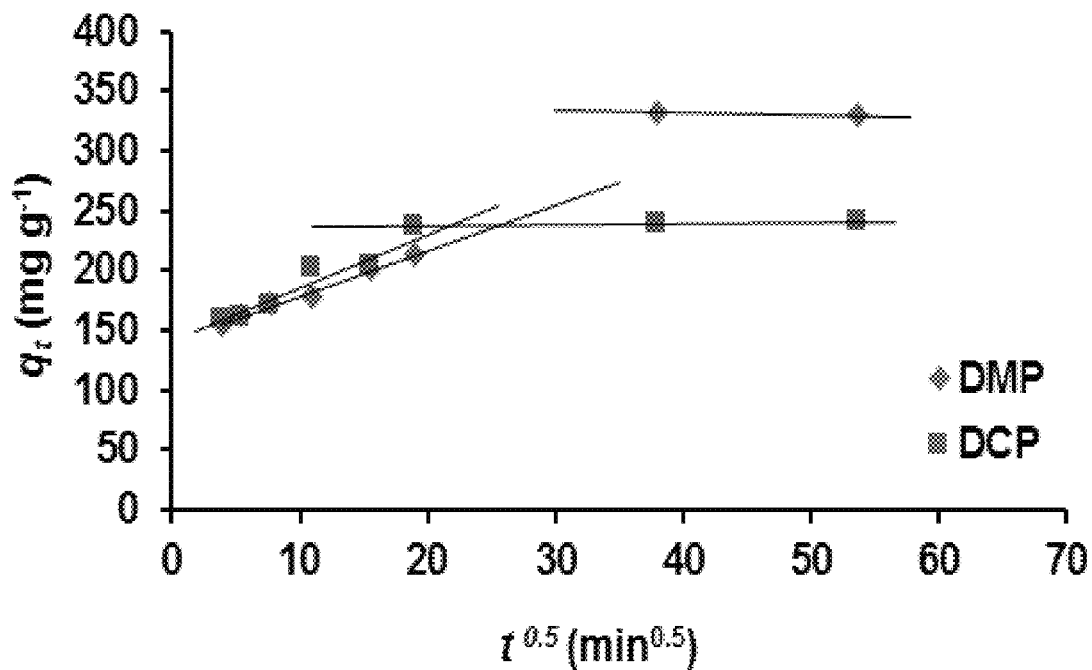

As a key parameter influencing the adsorption, the contact time was studied at different adsorbate concentrations and the adsorption kinetics parameters were calculated. It has been found that the SGAC removal efficiencies for DMP and DCP increase rapidly in the first four hours which is attributed to the maximum availability of unoccupied adsorption sites on the surface of SGAC. Then, it reaches the equilibrium within 24 h (shown in FIGS. 8A-8B). FIGS. 9A-9D show the plots of the linearized kinetics models. The adsorption kinetics' parameters are calculated from the slope and the intercept of the corresponding linear plot and summarized in Table 3.

The best fit model for the adsorption data was determined using the squared correlation coefficient ($R^2$) and the summation of relative error (SRE) between the experimental adsorption capacity ($q_{e\ exp.}$) and the calculated adsorption capacity ($q_{e\ cal.}$), the equation of SRE calculation is shown in Eq. (6).

$$SRE = \sum_{i=o}^{n}\left[\frac{(q_{e\ exp} - q_{e\ cal})_i^2}{q_{e\ exp}}\right] \quad (6)$$

The obtained squared correlation coefficients ($R^2$) are close to 1 and the SRE values are the lowest compared to others, which reveal the closeness of $q_e$ experimental ($q_{e\ exp.}$) and $q_e$ calculated ($q_{e\ cal.}$) values to each other, in the PSO model for both molecules over the entire studied range of concentrations. This clearly indicates the adsorption of DMP and DCP onto SGAC adsorbent follows the PSO kinetics which shows involvement of chemisorption in the adsorption mechanism [Y. Ho, G. McKay, Pseudo-second order model for sorption processes, Process Biochem., 1999, 34, 5, 451-465, incorporated herein by reference in its entirety]. It has been also noticed that the rate of adsorption ($K_2$) decreases with increasing the concentration of DMP and DCP. This might be attributed to the increase of repulsion between the molecules in the bulk as well as at the adsorbent surface which leads to a reduction of the adsorption rate.

For further investigation, the equilibrium adsorption data were fitted with the most widely applied intra-particle diffusion model described by Weber and Morris to investigate whether DMP and DCP adsorption is described as a diffusion-controlled process or not [W. Weber, J. M. Asce Jr., J. C. Morris, Kinetic of adsorption on carbon from solutions, J. Sanitary Eng. Div. Proc. Am. Soc. Civ. Eng., 1963, 31-59, incorporated herein by reference in its entirety]. It has been found that the plot of $q_t$ versus $t^{0.5}$ reveals two linear parts. This indicates that DMP and DCP adsorption is governed through two diffusion steps. The first step is fast and related to the diffusion of these adsorbates from the bulk solution to the available adsorption sites on the surface of the SGAC adsorbent, while the second step arises from the adsorption of these molecules onto the adsorption sites followed by the establishment of equilibrium, and this step occurs slower than the first one. Moreover, the plots did not pass through the origin which clearly indicates that the intra-particle diffusion was not the rate determining step [Agnes Pholosi, Eliazer B. Naidoo, Augustine E. Ofomaja, Intraparticle diffusion of Cr(VI) through biomass and magnetite coated biomass: a comparative kinetic and diffusion study, South Afr. J. Chem. Eng., 2020, 32, 39-55, incorporated herein by reference in its entirety].

In Freundlich, the n and $K_f$ values which are greater than 1 (Table 4) indicate that the adsorption of DMP and DCP onto SGAC is favorable. The higher magnitude of these values corresponds to a higher adsorption capacity [L. Li, P. A. Quinlivan, D. R. Knappe, Effects of activated carbon surface chemistry and pore structure on the adsorption of organic contaminants from aqueous solution, Carbon, 2002, 40, 12,

TABLE 3

Results of PFO, PSO, Elovich and Intra-particle diffusion adsorption kinetics models parameters.

| | | | PFO | | | | | | | |
|---|---|---|---|---|---|---|---|---|---|---|
| | | | DMP | | | | | | DCP | |
| $C_o$ | $q_{e\ Exp.}$ | $q_{e\ cal.}$ | $k_1$ | $R^2$ | SRE | $q_{e\ Exp.}$ | $q_{e\ cal.}$ | $k_1$ | $R^2$ | SRE |
| 10 | 49.84 | 11.76 | 0.0038 | 0.977 | 261.2 | 41.11 | 4.54 | 0.004 | 0.73 | 261.64 |
| 50 | 224.77 | 114.7 | 0.0013 | 0.8865 | 691.25 | 110.56 | 14.67 | 0.0031 | 0.74 | 685.53 |
| 200 | 332.53 | 175.93 | 0.0011 | 0.9833 | 1020.32 | 240.21 | 54.52 | 0.0025 | 0.7 | 1257.89 |
| | | | | | PSO | | | | | |
| $C_o$ | $q_{e\ Exp.}$ | $q_{e\ cal.}$ | $k_2$ | $R^2$ | SRE | $q_{e\ Exp.}$ | $q_{e\ cal.}$ | $k_2$ | $R^2$ | SRE |
| 10 | 49.84 | 50 | 0.0014 | 1 | 2.56 | 41.11 | 41.15 | 0.0033 | 1 | 0.21 |
| 50 | 224.77 | 227.27 | 0.0001 | 0.9969 | 75.65 | 110.56 | 111.11 | 0.001 | 1 | 0.6 |
| 200 | 332.53 | 344.83 | 0.00003 | 0.9953 | 149.84 | 240.21 | 243.9 | 0.0002 | 0.9999 | 25.84 |
| | | | | | Elovich Kinetics | | | | | |
| $C_o$ | $q_{e\ Exp.}$ | $q_{e\ cal.}$ | a | b | $R^2$ | SRE | $q_{e\ Exp.}$ | $q_{e\ cal.}$ | a | b | $R^2$ | SRE |

| $C_o$ | $q_{e\ Exp.}$ | $q_{e\ cal.}$ | a | b | $R^2$ | SRE | $q_{e\ Exp.}$ | $q_{e\ cal.}$ | a | b | $R^2$ | SRE |
|---|---|---|---|---|---|---|---|---|---|---|---|---|
| 10 | 49.84 | 52.15 | 19324.95 | 0.3202 | 0.9205 | 0.46 | 41.11 | 43.86 | 68730.49 | 0.4155 | 0.6999 | 1.88 |
| 50 | 224.77 | 217.97 | 58.88 | 0.0405 | 0.9722 | 2.76 | 110.56 | 117.47 | 95035.54 | 0.1492 | 0.7991 | 2.92 |
| 200 | 332.53 | 320.33 | 74.36 | 0.027 | 0.8703 | 22.16 | 240.21 | 251.33 | 6530.99 | 0.0551 | 0.8921 | 4.31 |

Intra-particle Diffusion Parameters

| $C_o$ | $k_{id}$ | C | $R^2$ | $k_{id}$ | C | $R^2$ |
|---|---|---|---|---|---|---|
| 10 | 0.27 | 38.21 | 0.6645 | 0.19 | 33.57 | 0.4022 |
| 50 | 2.53 | 101 | 0.9532 | 0.55 | 88.4 | 0.4953 |
| 200 | 3.97 | 141.53 | 0.9369 | 1.65 | 169.37 | 0.6872 |

Adsorption Isotherms

Figure 10A:
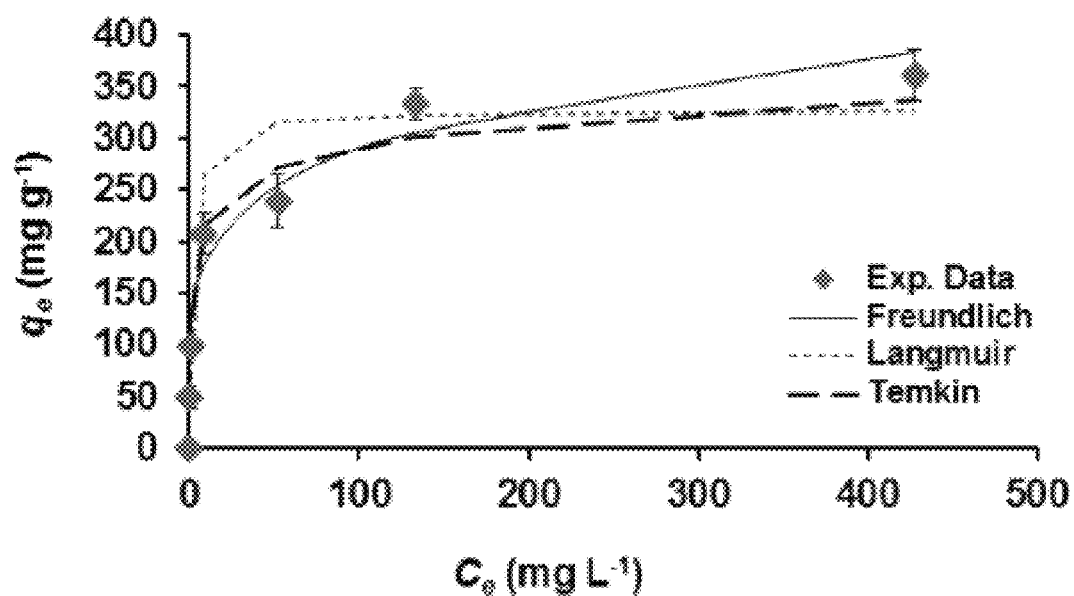
FIGS. 10A-10B are adsorption isotherms of DMP (FIG. 10A) and DCP (FIG. 10B) using the activated carbon sorbent (0.2 g L⁻¹) at solution pH of 5.76 and shaking time of 24 h at 24° C.
Figure 10B:
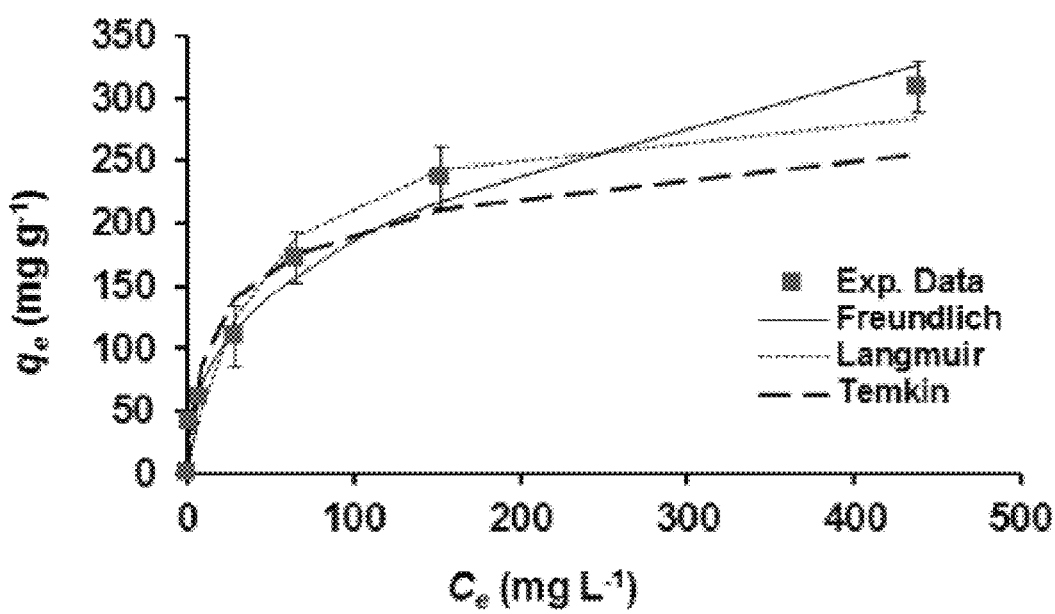
Figure 11A:
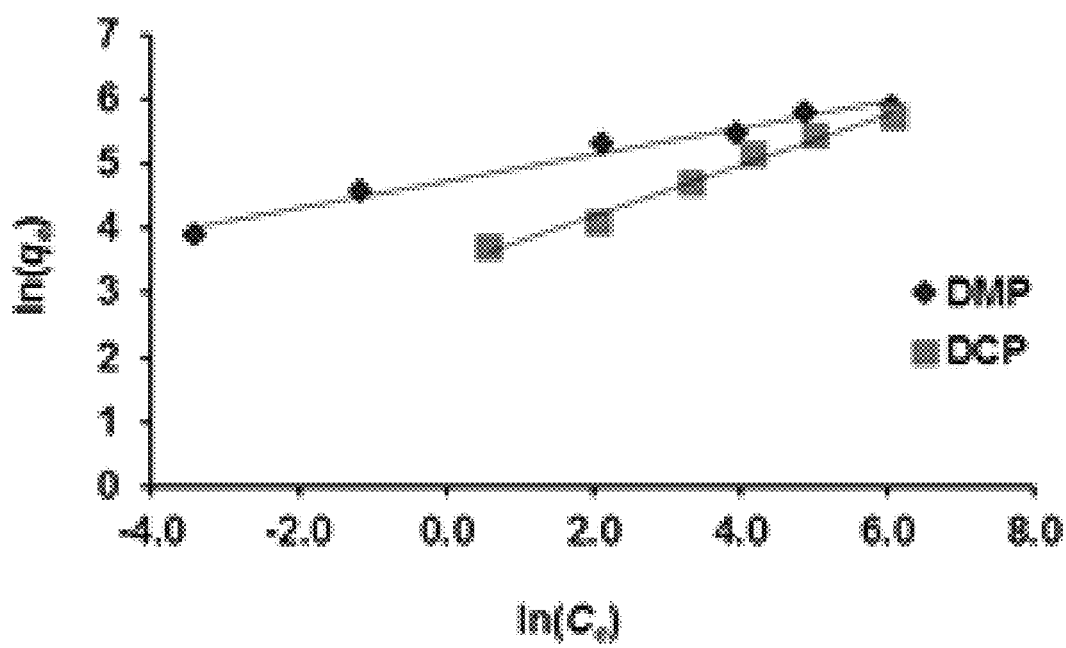
FIGS. 11A-11C are linear least square fitting of the DMP and DCP adsorption data using Freundlich (FIG. 11A), Langmuir (FIG. 11B), and Temkin (FIG. 11C) isotherms models.
Figure 11B:
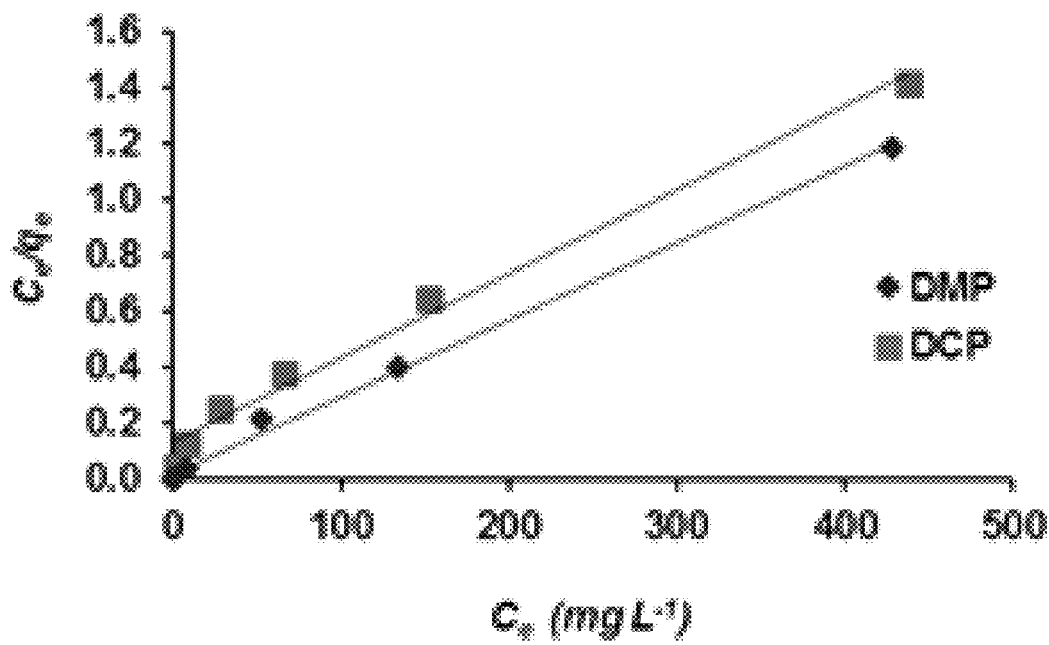
Figure 11C:
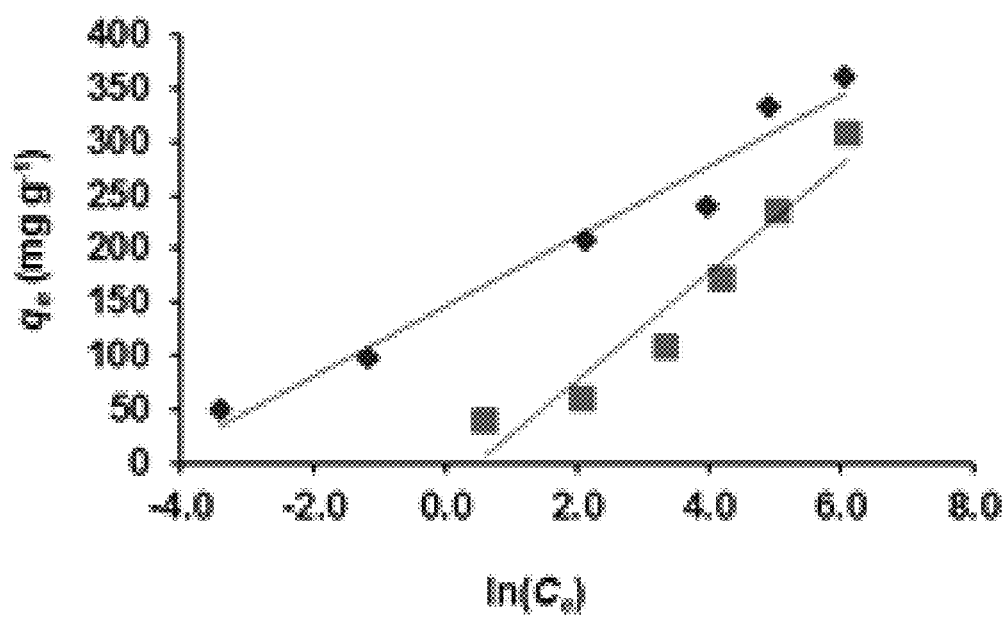

FIGS. 10A-10B shows the concave to the axis adsorption isotherms of DMP and DCP which match type I adsorption isotherm. This indicates the adsorption sites are well distributed on the surface of adsorbent which have a micro and nanoporous structure [S. Lowell, J. E. Shields, Powder Surface Area and Porosity, 3rd ed., Chapman and Hall New York, 1991, incorporated herein by reference in its entirety]. Different isotherm models were tested for DMP and DCP adsorption onto SGAC adsorbent. The plots of the linear forms of the tested adsorption isotherm models (i.e. Freundlich, Langmuir and Temkin) are presented in FIGS. 11A-11C.

The models' parameters for DMP and DCP adsorption onto SGAC are summarized in Table 4. These parameters were calculated from the slope and the intercept of the corresponding adsorption isotherm model linear form. The best fit isotherm model for the adsorption data was validated using the squared correlation coefficient ($R^2$) and the summation of relative error (SRE) between the experimental adsorption capacity ($q_{e\ exp.}$) and the calculated adsorption capacity ($q_{e\ cal.}$). Even though the obtained $R^2$ values for Langmuir and Temkin models are relatively good (>0.9; Table 4), the lowest SRE obtained is for the Freundlich model. Hence the Freundlich isotherms are the best fit for the experimental adsorption results of DMP and DCP molecules. This indicates that the surface of SGAC adsorbent is mostly heterogeneous and the adsorption mechanism is mixed and the physisorption is the predominant mechanism.

2085-2100, incorporated herein by reference in its entirety]. The separation factor ($R_L$) was obtained from the Langmuir constant (b) and calculated by using Eq. (7). The low values of $R_L$, between zero and one shows the favorability of DMP and DCP adsorbate adsorption onto the SGAC adsorbent. The maximum monolayer adsorption capacity ($Q_0$) of SGAC for DMP and DCP are 364 mg g$^{-1}$ and 333 mg g$^{-1}$ respectively (Table 4). The proposed interaction mechanism between these molecules and the SGAC surface mostly involve electrostatic, Van der Waals, hydrogen bonding, π-π interactions and pore filling.

$$R_L = 1/(1+bC_0) \qquad (7)$$

TABLE 4

The output parameters of Freundlich, Langmuir and Temkin isotherm models

| Models Parameters | DMP | DCP |
|---|---|---|
| Freundlich | | |
| n | 4.84 | 2.55 |
| $K_f$ ((mg g$^{-1}$)( L mg$^{-1}$)$^{1/n}$) | 114.34 | 30.61 |
| $R^2$ | 0.9766 | 0.9871 |
| SRE | 12.98 | 5.56 |
| Langmuir | | |
| b (L mg$^{-1}$) | 0.11 | 0.02 |
| $Q_0$ (mg g$^{-1}$) | 364.74 | 333.55 |
| $R_L$ | 0.02 | 0.08 |

TABLE 4-continued

The output parameters of Freundlich, Langmuir and Temkin isotherm models

| Models Parameters | DMP | DCP |
|---|---|---|
| $R^2$ | 0.9963 | 0.9863 |
| SRE | 149.01 | 30.81 |
| Temkin | | |
| $A_T (L g^{-1})$ | 7.41 | 0.61 |
| $b_T$ (J mol$^{-1}$) | 73.09 | 47.73 |
| $R^2$ | 0.9657 | 0.9304 |
| SRE | 327.10 | 52.89 |

Thermodynamics of Adsorption

Figure 12:
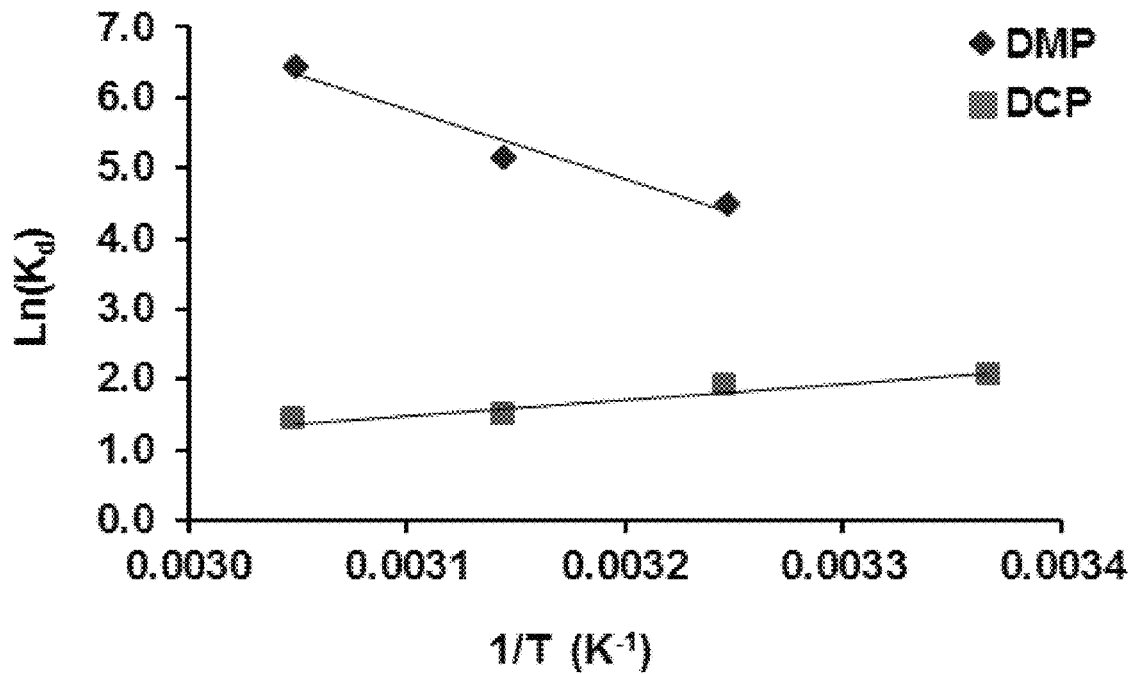
FIG. 12 is a plot of ln $K_d$ vs. 1/T for DMP and DCP adsorption onto SGAC adsorbent.

FIG. 12 shows the plots of Ln($K_d$) versus 1/T. The slope and intercept of this plot were used to calculate the enthalpy ($\Delta H$) and entropy ($\Delta S$) of DMP and DCP and later to calculate their adsorption free energy ($\Delta G$). Table 5 summarizes the thermodynamics parameters for DMP and DCP adsorption onto SGAC adsorbent. It has been found that the free energy ($\Delta G$) values are negative in the studied temperature range (297 to 323 K). This indicates that the adsorption process is spontaneous and thermodynamically favorable. Decreasing the $\Delta G$ values with increasing the temperature and the positive value of $\Delta H$ for DMP indicates that the adsorption process is endothermic. Whereas in the case of DCP, the $\Delta G$ value increases with increasing the temperature which reveals that the process is exothermic. Additionally, the low values of $\Delta G$, ranging between −15.81 to −7.91 kJ mol$^{-1}$ and −5.12 to −3.97 kJ mol$^{-1}$, and the obtained values of $\Delta H$, 82.29 kJ mol$^{-1}$ and −18.37 kJ mol$^{-1}$ for DMP and DCP respectively, reveal that the adsorption mechanism is mixed and the physical adsorption is predominant [P. Saha, S. Chowdhury, Insight into adsorption thermodynamics, in: Prof. Mizutani Tadashi (Ed.), Thermodynamics, InTech, 2011. ISBN: 978-953-307-544-0; and H. Zaghouane-Boudiaf, M. Boutahala, Adsorption of 2,4,5-trichlorophenol by organo-montmorillonites from aqueous solutions: kinetics and equilibrium studies, Chem. Eng. J., 2011, 170, 120-126, each of which is incorporated herein by reference in its entirety]. The positive entropy value in the case of DMP adsorption indicates that the randomness increases at the adsorbate/adsorbent interface. However, in the case of DCP adsorption, with negative $\Delta S$, the randomness decreases at the adsorbate/adsorbent interface.

TABLE 5

Thermodynamic parameters for the adsorption of DMP and DCP.

| Temperature | $\Delta G$ (kJ mol$^{-1}$) | | $\Delta H$ (kJ mol$^{-1}$) | | $\Delta S$ (kJ (mol$^{-1}$ K$^{-1}$) | |
|---|---|---|---|---|---|---|
| (K) | DMP | DCP | DMP | DCP | DMP | DCP |
| 297 | −7.91 | −5.12 | 82.29 | −18.37 | 0.30 | −0.04 |
| 308 | −11.25 | −4.63 | | | | |
| 318 | −14.29 | −4.19 | | | | |
| 323 | −15.81 | −3.97 | | | | |

Comparison with Other Adsorbents

Figure 13:
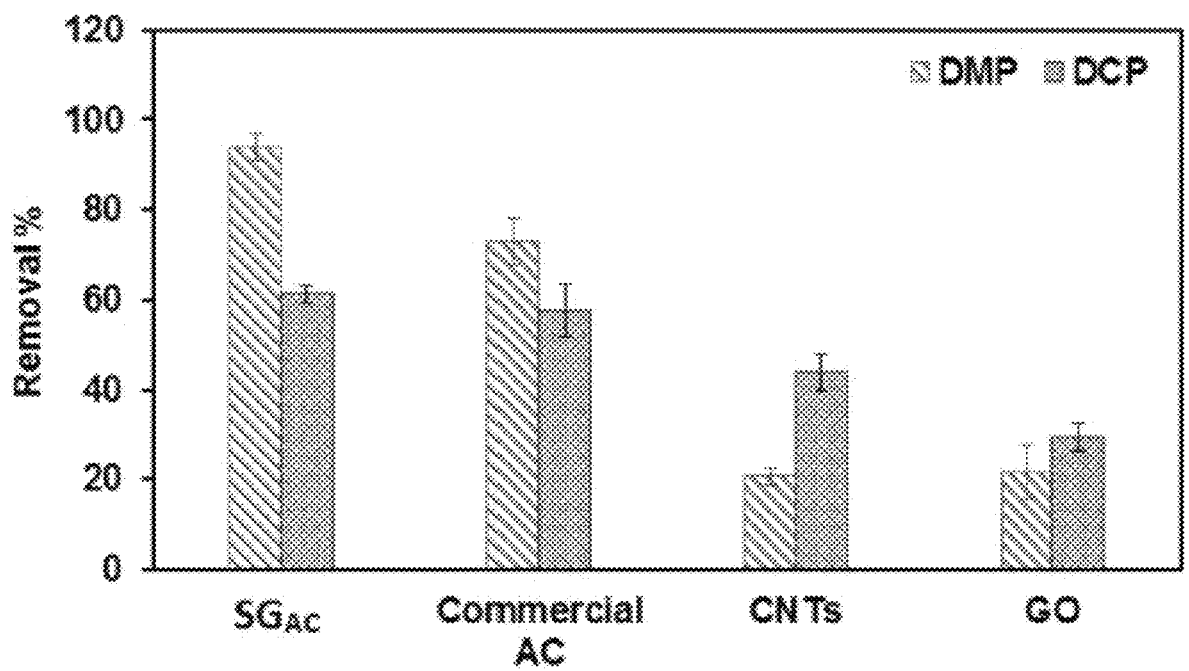
FIG. 13 is a comparison of the activated carbon sorbent with other common adsorbents at the same adsorption conditions (i.e. 0.2 g L⁻¹ adsorbent, 20 mg L⁻¹ adsorbate, pH of 5.76 and contact time 24 h).

At the same experimental conditions, the most commonly used adsorbents (commercial coconut activated carbon (AC), carbon nanotubes (CNTs) and graphene oxide (GO)) were also tested for the removal of DMP and DCP and compared with the prepared adsorbent (SGAC) (FIG. 13). At the same time the adsorption capacity of SGAC was also compared with others adsorbents reported in the literature and summarized in Table 6 [J. Vittenet, J. Rodriguez, E. Petit, D. Cot, J. Mendret, A. Galarneau, S. Brosillon, Removal of 2,4-dimethylphenol pollutant in water by ozonation catalyzed by SOD, LTA, FAU-X zeolites particles obtained by pseudomorphic transformation (binderless), Microporous Mesoporous Mater., 2014, 189, 200-209; A. K. Jain, Bhatnagar A. Suhas, Methylphenols removal from water by low-cost adsorbents, J. Colloid Interface Sci., 2002, 251, 1, 39-45; D. Batabyal, A. Sahu, S. K. Chaudhuri, Kinetics and mechanism of removal of 2,4-dimethyl phenol from aqueous solutions with coal fly ash, Sep. Technol., 1995, 5, 179-186; M. K. Nazal, D. Rao, N. Abuzaid, The nature and kinetics of 2,4-dimethylphenol adsorption in aqueous solution on biochar derived from *Sargassum boveanum* macroalgae, J. Water Supply Res. Technol. AQUA, 2020, 69, 5, 438-452; Hanjun Wu, Weijun Zhang, Huali Zhang, YiPana Xiaofang Yang, Zhiquan Pan, Xuejun Yu, Dongsheng Wang, Preparation of the novel g-C3N4 and porous polyimide supported hydrotalcite-like compounds materials for water organic contaminants removal, Colloids Surf. A Physicochem. Eng. Asp., 2020, 607, 125517; A. Ghaffari, M. S. Tehrani, S. W. Husain, M. Anbia, P. A. Azar, Adsorption of chlorophenols from aqueous solution over amino-modified ordered nanoporous silica materials, J. Nanostruct. Chem., 2014, 4, 3, 1-10; D. Garmia, H. Zaghouane-Boudiaf, C'esar Viseras Ibbora, Preparation and characterization of new low cost adsorbent beads based on activated bentonite encapsulated with calcium alginate for removal of 2,4-dichlorophenol from aqueous medium, Int. J. Biol. Macromol., 2018, 115, 257-265; and Sherif A. Younisa, Eman A. Motaweaa, Yasser M. Moustafaa, Jechan Leed, Ki-Hyun Kimc, A strategy for the efficient removal of chlorophenols in petrochemical wastewater by organophilic and aminated silica@alginate microbeads: Taguchi optimization and isotherm modeling based on partition coefficient, J. Hazard. Mater., 2020, 397, 122792, each of which is incorporated herein by reference in its entirety]. It has been noticed that the performance of SGAC is better than the commercial AC, CNTs and GO. Additionally, it has a comparable adsorption capacity with the other adsorbents reported in the literature. This indicates that the prepared adsorbent is promising for the removal of methylated and chlorinated phenolic compounds for wastewater treatment application.

TABLE 6

Adsorption capacity of different adsorbent for DMP and DCP phenolic compounds

| Adsorbent | Adsorption capacity (mg/g) |
|---|---|
| DMP | |
| K-FAU-X (Zeolite) | 0.6 |
| Blast Furnace Dust | 18.3 |
| Blast Furnace Sludge | 21.9 |
| Carbonaceous adsorbent | 65.9 |
| Standard activated Charcol | 140.5 |
| Coal fly ash | 3.0 |
| Biochar derived from Sargassum macroalgae | 17.0 |
| $SG_{AC}$ | 364 mg/g |
| DCP | |
| g-C$_3$N$_4$@PI@CHTLcs | 185.05 |
| Aminated-silica (MCM-48/TMSPA) | 362 |
| unmodified silica (MCM-48) | 167 |
| Hexadecyltrimethyl-ammonium-Bentonite/Alginate | 185.0 |

TABLE 6-continued

Adsorption capacity of different adsorbent for DMP and DCP phenolic compounds

| Adsorbent | Adsorption capacity (mg/g) |
| --- | --- |
| beads | |
| Granular activated carbon | 250 |
| Urea-SiO @alginate beads | 170.8 |
| $SG_{AC}$ | 333 mg/g |

Application and Regeneration of Adsorbent

Figure 14:
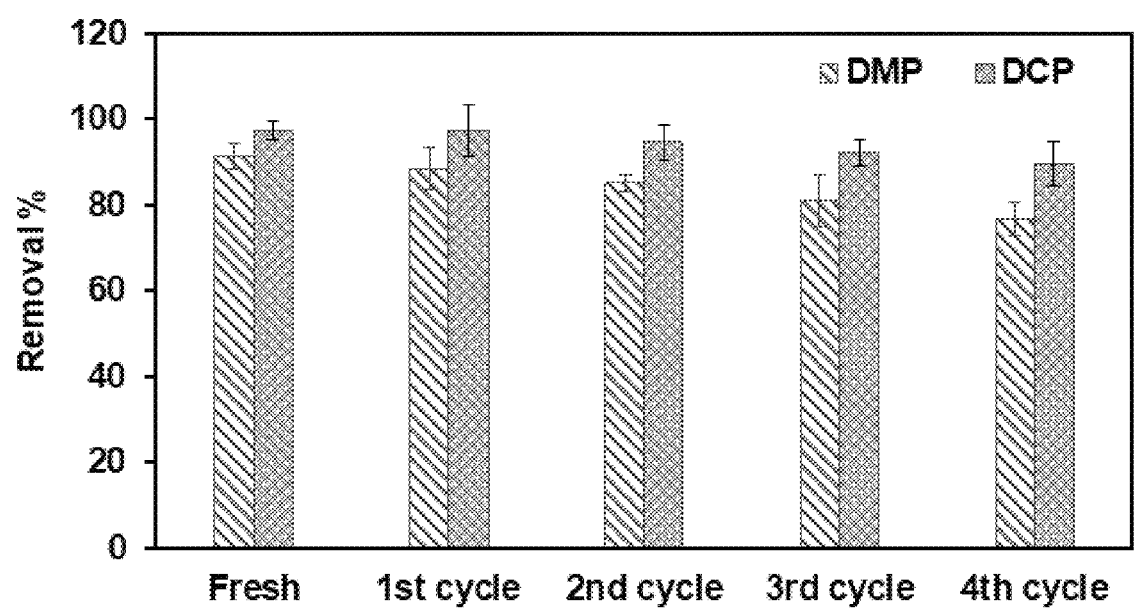
FIG. 14 is a plot showing the performance of SGAC adsorbent for the removal of DMP and DCP after four adsorption-desorption cycles.

The adsorptive removal of DMP and DCP from synthetic wastewater having 20 mg $L^{-1}$ of each, using 0.2 g $L^{-1}$ adsorbent dose was tested. It has been found that the removal efficiencies are 91% and 97% of DMP and DCP respectively. The reusability of adsorbents is significant for adsorptive removal applications to approach the real application. Therefore, it has been tested and the results are presented in FIG. 14. It has been found that the removal efficiencies slightly decrease from 91% to 76% and from 97% to 89% for DMP and DCP respectively after four cycles. The slight decrease in the removal efficiencies may be attributed to the loss some of the adsorption sites during the regeneration process.

The invention claimed is:

1. A method of forming an activated carbon sorbent, the method comprising:
   treating a seagrass with a base solution to form an intermediate solid;
   drying the intermediate solid to form a precursor; and
   pyrolyzing the precursor at 600 to 1000° C. to form the activated carbon sorbent, wherein the activated carbon sorbent has a mean surface area of 1000 to 1250 m²/g, and wherein the activated carbon sorbent comprises,
   70 to 92.5 wt % carbon;
   15 to 23 wt % oxygen;
   1 to 5 wt % calcium;
   1 to 5 wt % magnesium; and
   0.1 to 0.9 wt % potassium, each based on a total weight of activated carbon sorbent.

2. The method of claim 1, wherein the seagrass is a member of the family Cymodoceaceae.

3. The method of claim 1, wherein the seagrass is a member of the genus *Halodule*.

4. The method of claim 1, wherein the seagrass is *Halodule uninervis*.

5. The method of claim 1, wherein the pyrolyzing is performed under an inert atmosphere for 1 to 12 hours.

6. The method of claim 1, wherein the base solution is an aqueous solution of a hydroxide base.

7. The method of claim 6, wherein the base solution is used in an amount of 5 to 20 mmol hydroxide base per gram of seagrass.

8. The method of claim 1, wherein the activated carbon sorbent has a mean pore volume of 0.400 to 0.525 cc $g^{-1}$.

9. The method of claim 1, wherein the activated carbon sorbent has a point of zero charge pH ($pH_{zpc}$) of 8 to 11.5.

10. The method of claim 1, wherein the activated carbon sorbent comprises 16 to 21 wt % oxygen based on a total weight of activated carbon sorbent.

11. The method of claim 1, wherein the activated carbon sorbent comprises 17 to 19 wt % oxygen based on a total weight of activated carbon sorbent.

12. The method of claim 1, wherein the activated carbon sorbent comprises 17.5 to 18 wt % oxygen based on a total weight of activated carbon sorbent.

13. The method of claim 1, wherein the activated carbon sorbent consists of:
   81.5 to 92.5 wt % carbon;
   15 to 23 wt % oxygen;
   1 to 5 wt % calcium;
   1 to 5 wt % magnesium; and
   0.5 to 0.9 wt % potassium, each based on a total weight of activated carbon sorbent.

* * * * *